United States Patent [19]
Hotta et al.

[11] Patent Number: 5,504,593
[45] Date of Patent: Apr. 2, 1996

[54] CONTINUOUS AND UNIFORM HOLOGRAM RECORDING METHOD AND UNIFORMLY RECORDED HOLOGRAM

[75] Inventors: Tsuyoshi Hotta; Yuko Kuwabara; Osamu Takekoh, all of Tokyo, Japan

[73] Assignee: Dai Nippon Printing Co., Ltd., Tokyo, Japan

[21] Appl. No.: 128,158

[22] Filed: Sep. 29, 1993

[30] Foreign Application Priority Data

| Dec. 26, 1992 | [JP] | Japan | 4-336119 |
| May 19, 1993 | [JP] | Japan | 5-139306 |
| Aug. 5, 1993 | [JP] | Japan | 5-194540 |

[51] Int. Cl.$^6$ ............................................. G03H 1/00
[52] U.S. Cl. ............................. 359/1; 359/3; 359/12; 359/34; 359/35
[58] Field of Search .................... 359/1, 3, 12, 34, 359/35

[56] References Cited

U.S. PATENT DOCUMENTS

| 4,714,309 | 12/1987 | Woodcock et al. | 359/34 |
| 4,856,857 | 8/1989 | Takeuchi et al. | 359/3 |
| 4,908,285 | 3/1990 | Kushibiki et al. | 359/3 |
| 4,995,685 | 2/1991 | Armstrong et al. | 359/3 |
| 5,083,219 | 1/1992 | Jannson et al. | 359/35 |
| 5,096,790 | 3/1992 | Monroe | 359/3 |

*Primary Examiner*—Frank Gonzalez
*Assistant Examiner*—Jason D. Eisenberg
*Attorney, Agent, or Firm*—Sughrue, Mion, Zinn, Macpeak & Seas

[57] ABSTRACT

A hologram recording method wherein a transparent member for introducing a light beam into a recording material is designed so that the transparent member and the recording film can be uniformly brought into close contact with each other through an index matching liquid without damaging the recording film, and it is possible to stably carry out uniform and continuous exposure without failure of recording nor occurrence of unnecessary interference fringes. Also disclosed is a recorded hologram. A transparent member (3) is disposed at one surface of a recording film (2). A surface (5) of the transparent member (3) that is brought into close contact with the recording film (2) is convexly curved only in the direction of feed of the recording film (2). In addition, the space between the contact surface (5) and the recording film (2) is filled with an index matching liquid (4) so that the recording film (2) is brought into close contact with the transparent member (3) through the index matching liquid (4). In this state, a light beam is made incident on a surface (6) of the transparent member (3) other than the contact surface (5) so that the incident light beam reaching the recording film (2) through the contact surface (5) and the light beam reflected from the interfacial boundary between the reverse surface of the recording film (2) and the air interfere with each other in the recording film (2), thereby forming and recording interference fringes in the recording film (2).

42 Claims, 11 Drawing Sheets

(a)

(b)

Perpendicular direction

Parallel direction

Perpendicular direction

Parallel direction

CONTINUOUS AND UNIFORM HOLOGRAM RECORDING METHOD AND UNIFORMLY RECORDED HOLOGRAM

BACKGROUND OF THE INVENTION

The present invention relates to a hologram recording method and a recorded hologram. More particularly, the present invention relates to a method of continuously recording holographic interference fringes in a recording film, and also relates to a recorded hologram.

As a method of recording holographic interference fringes, it is well-known practice to make light incident normally on a recording material. There are, however, cases where a beam of light is made incident on the surface of a recording material at a relatively small angle thereto in order to select various pitches for interference fringes to be recorded. However, as the angle of incidence with respect to the surface of the recording material decreases, the rate at which the incident light is reflected due to the refractive index difference between the air and the recording material rises, resulting in a reduction in the quantity of light entering the recording material. Consequently, the energy of light entering the inside of the hologram dry plate per unit of time decreases, and the exposure time lengthens correspondingly. To cope with the problem experienced when light is made incident on the surface of the recording material at a relatively small angle, the conventional practice has been to allow the light beam to enter the recording material through a transparent member having an incidence surface approximately perpendicular to the incident light. For this purpose, a glass block or a prism is used as a transparent member.

FIG. 17 shows an example in which glass blocks are used. A pair of glass blocks 42 and 43 each having a refractive index close to that of a recording material 41 are brought into close contact with both sides, respectively, of the recording material 41, and light beams 44 and 45 are made incident on the surfaces of the recording material 41 through the glass blocks 42 and 43, thereby eliminating reflection at the surfaces of the recording material 41 and increasing the amount of energy incident per unit of time, and thus enabling the desired hologram to be recorded efficiently.

FIG. 18 shows an example in which prisms are used as transparent members. A pair of prisms 46 and 47 are disposed on both sides, respectively, of the recording material 41 in the same way as in the arrangement shown in FIG. 17 so that light beams 44 and 45 which are incident substantially normally on the respective surfaces of the prisms 46 and 47 interfere with each other in the recording material 41, thereby recording the desired hologram.

There has also been proposed a technique whereby a glass block is rotated so that the incidence surface of the glass block is always perpendicular to the incident light beam, although not shown in the accompanying drawings, (see Japanese Patent Application Laid-Open (KOKAI) No. 3-237481).

In addition, Japanese Patent Application Laid-Open (KOKAI) Nos. 1-154079 and 3-271788 disclose a method wherein a plane of a transparent member is brought into close contact with a recording film to expose the film through the transparent member, thereby continuously producing a holographic mirror.

However, the conventional hologram recording method in which transparent members are brought into close contact with both sides of a recording material suffers from the problem that exceedingly large transparent members are needed particularly when exposure is effected over a large area, so that the system becomes costly and bulky and also increases in weight.

The conventional method in which a holographic mirror is continuously produced by effecting exposure through a transparent member is a method for forming interference fringes parallel to the surface of a recording film and not a method for continuously forming interference fringes inclined with respect to the film surface. To reflect sunbeams incident along a direction other than the normal direction as in the case of a heat ray reflecting film in particular, it is preferable to record interference fringes inclined with respect to the film surface because the reflection efficiency can be considerably increased by doing so, as described later.

With the conventional method, a holographic mirror can be recorded in principle, but since the interface of close contact between the recording film and the transparent member used for the incidence of a light beam is a plane, many problems as stated below occur in practice, causing the quality of the produced hologram to be degraded:

Firstly, the recording film may be damaged when contacted by the edge of the transparent member.

Secondly, since the interface between the recording film and the transparent member is a plane, air bubbles inevitably get mixed in the index matching liquid, causing a failure of holographic recording in regions where the air bubbles are present.

Thirdly, since the amount of index matching liquid to be supplied is large due to the structure of the recording system, the index matching liquid is likely to become non-uniform. In addition, the transparent member and the recording film are contaminated with the index matching liquid. Therefore, it is likely that unnecessary interference fringes will occur and the diffraction characteristics will become non-uniform.

Fourthly, since the recorded interference fringes lie in only one direction (parallel to the film surface) and cannot be multiplexed, it is difficult to obtain a holographic mirror providing a wide diffraction spectrum as in the case of a heat ray reflecting film.

SUMMARY OF THE INVENTION

The present invention has been made to solve the above-described problems, and it is an object of the present invention to provide a hologram recording method wherein a transparent member for introducing a light beam into a recording material is designed so that the transparent member and the recording film can be uniformly brought into close contact with each other through an index matching liquid without damaging the recording film, and it is possible to stably carry out uniform and continuous exposure without failure of recording nor occurrence of unnecessary interference fringes and to mass-produce uniform, non-defective holograms having a large area, and also provide a recorded hologram.

To attain the above-described object, the present invention provides a hologram recording method which is based on the principle that a transparent member having a surface convexly curved only in the direction of feed of a continuously fed recording film is brought into close contact with one surface of the recording film by the combination of its own weight and tension applied to the recording film, or the recording film is brought into close contact with the transparent member, which is fixed, by tension applied to the recording film, and a light beam is made incident on one surface of the transparent member so that the incident light beam reaching the recording film and the light beam reflected from the interfacial boundary between the reverse surface of the recording film and the air interfere with each other in the recording film, thereby forming and recording interference fringes in the recording film.

That is, the hologram recording method of the present invention is a method of recording a hologram in a continuously fed recording film by the interference of light. A transparent member is disposed at one surface of the recording film. A surface of the transparent member that is brought into close contact with the recording film is convexly curved only in the direction of feed of the recording film. In addition, the space between the contact surface of the transparent member and the recording film is filled with an index matching liquid so that the recording film is brought into close contact with the transparent member through the index matching liquid. In this state, a light beam is made incident on a surface of the transparent member other than the contact surface thereof so that the incident light beam reaching the recording film through the contact surface and the light beam reflected from the interfacial boundary between the reverse surface of the recording film and the air interfere with each other in the recording film, thereby forming and recording interference fringes in the recording film.

In this case, the light beam, which is made incident on a surface of the transparent member other than the contact surface thereof, may be a light beam that is reciprocated to scan in a direction intersecting the direction of feed of the recording film so that the scanning light beam reaching the recording film through the contact surface and the light beam reflected from the interfacial boundary between the reverse surface of the recording film and the air interfere with each other in the recording film, thereby forming and recording interference fringes in the recording film. Further, a surface of the recording film on a side thereof which will not come in contact with the transparent member may be formed with a layer having a thickness distribution in a direction perpendicular to the direction of feed of the recording film so that the incident light beam is reflected at the surface of this layer.

Preferably, surfaces of the transparent member, exclusive of the light beam incidence surface and the contact surface, have previously been subjected to a light-absorbing treatment, and portions of the recording film other than the irradiated portion thereof are shielded from light.

Furthermore, the transparent member is preferably made of a material having a refractive index differing from that of the recording film by 0.2 or less in the temperature range of from 15° C. to 25° C. Specific examples of such a material are as follows: When the principal component of the recording film is a polyvinyl carbazole derivative, the transparent member is preferably made of F2 glass, a polyester resin, an allyl resin having a high refractive index, or an acrylic resin having a high refractive index; when the principal component of the recording film is a polyvinyl acetate derivative, the transparent member is preferably made of BK-7 glass or quartz glass; and when the principal component of the recording film is a polyester, the transparent member is preferably made of F2 glass.

The light beam is preferably made incident on the light incidence surface of the transparent member at an angle of 90°±10° to it.

The curvature radius of the contact surface of the transparent member is preferably in the range of from 10 mm to 100 mm. Furthermore, the angle made between one side surface of the transparent member and the recording film when the recording film comes in contact with the contact surface of the transparent member and the angle made between another side surface of the transparent member and the recording film when the recording film comes out of the contact with the contact surface are both preferably in the range of from 5° to 45°.

In addition, the size of the incident light beam in the direction of feed of the recording film is preferably not larger than 3 mm with regard to beam sizes which provide at least 13.5% of the maximum intensity.

It is also preferable that a tension of 10 kg/m to 50 kg/m should be applied to the recording film, and that the thickness of the index matching liquid between the recording film and the contact surface should be not larger than 500 µm.

It should be noted that the transparent member may be disposed at either the upper or lower side of the recording film.

Incidentally, when the surface of the recording film that will not come in contact with the transparent member is formed with a layer having a thickness distribution in a direction perpendicular to the direction of feed of the recording film, the layer may have a thickness distribution in which the layer thickness gradually increases. In such a case, the angle between the surface of the layer having the thickness distribution and the surface of the recording film may be larger than 0° and not larger than 10°. In this case, interference fringes recorded in the recording film can be inclined at an angle larger than 0° and not larger than 10° to the film surface.

Another hologram recording method of the present invention is a method of recording a hologram in a continuously fed recording film by the interference of light. The recording film is sandwiched between a transparent member disposed at a side where a light beam enters and a reflector disposed at a side where the light beam reflects. The transparent member has a light incidence surface at a portion thereof other than the surface thereof which is in contact with the recording film, and the light beam is made incident on the light incidence surface of the transparent member so that the incident light beam reaching the recording film and the light beam transmitted by the recording film and reflected from a reflecting surface of the reflector interfere with each other in the recording film, thereby forming and recording interference fringes in the recording film.

In this case, the reflecting surface and the surface of the recording film may be disposed at an angle to each other to vary the angle of the reflected light beam to thereby record oblique interference fringes in the recording film.

It is also possible to form the reflecting surface in a staircase shape so as to make an angle between the reflecting surface and the surface of the recording film, thereby varying the angle of the reflected light beam, and thus recording oblique interference fringes in the recording film.

The reflecting surface may have a holographic reflecting layer thereon so that the angle of the reflected light beam is varied by the holographic reflecting layer, thereby recording oblique interference fringes in the recording film.

Furthermore, it is preferable to use a linear light beam as the incident light beam and to feed the recording film along the respective recording film contact surfaces of the transparent member and the reflector. The recording film contact surfaces of the transparent member and the reflector are preferably arranged such that one of the two contact surfaces is a convex surface and the other is a concave surface. In addition, the space between the recording film and the transparent member and/or the space between the recording film and the reflector is preferably filled with an index matching liquid so that the recording film is brought into close contact with the transparent member and/or the reflector through the index matching liquid. It should be noted that the difference between the refractive indices of the transparent member, the recording film and the index matching liquid is preferably not larger than 0.2 in the temperature range of from 15° C. to 25° C.

It is also possible to form the reflector of a transparent material so that the difference between the refractive indices of the reflector, the recording film and the index matching liquid is not larger than 0.2 in the temperature range of from 15° C. to 25° C.

The reflecting surface of the reflector may be the above-described recording film contact surface or a surface other than it. The reflecting surface may define an interface in cooperation with the air. It is also possible to form a mirror reflecting layer on the reflecting surface.

Furthermore, surfaces of the two transparent members, exclusive of the light incidence surface and the recording film contact surfaces, are preferably light-absorbing surfaces, and portions of the recording film other than the portion thereof where the interference is to be caused are preferably shielded from light.

It should be noted that the angle between the normal to the light incidence surface and the incident light beam is preferably in the range of from 0° to 10°.

Still another hologram recording method of the present invention is a method of recording a hologram in a continuously fed recording film by the interference of light. The recording film is wound on a mirror-finished, light-reflecting roll, and a transparent member is brought into close contact with the upper side of the recording film. While the recording film is continuously fed by rotating the roll, a light beam is made incident substantially normally on one surface of the transparent member so that the incident light beam and the light beam reflected from the mirror surface of the roll interfere with each other in the recording film, thereby forming and recording interference fringes in the recording film.

In this case, the arrangement may be such that the transparent member is disposed at the lower side of the roll and the surface of the transparent member that faces the roll has the same arcuate configuration as that of the surface of the roll and that the space between the arcuate portion of the transparent member and the roll is filled with an index matching liquid so that the roll is brought into close contact with the transparent member through the index matching liquid by making use of gravity. Preferably, surfaces of the transparent member on which no light beam will be incident have previously been subjected to a light-absorbing treatment.

The hologram of the present invention is a hologram comprising equally spaced interference fringes recorded in a recording film in parallel to at least one direction of the plane of the recording film. The interference fringes are recorded such that the disorder of the interference fringes in a cross-section along the above direction is larger than the disorder of the interference fringes in a cross-section along a direction perpendicular to the first-mentioned direction.

In this case, the interference fringes may be recorded such that those in the cross-section along the direction perpendicular to the first-mentioned direction are at an angle to the plane of the recording film.

Thus, according to the present invention, a transparent member is disposed at one surface of a recording film, and the space between the recording film and the film contact surface of the transparent member is filled with an index matching liquid so that the recording film is brought into close contact with the transparent member through the index matching liquid. In this state, a light beam is made incident on a surface of the transparent member other than the recording film contact surface so that the incident light beam reaching the recording film through the contact surface and the light beam reflected from the interfacial boundary between the reverse surface of the recording film and the air interfere with each other in the recording film, thereby forming and recording interference fringes in the recording film. Accordingly, even if the angle of incidence of the light beam to the surface of the recording film is small, exposure of high efficiency can be realized. In addition, it is possible to select various pitches for interference fringes to be recorded by varying the angle of the incident light beam to the surface of the recording film.

If a recording film of continuous length is subjected to exposure using a linear light beam while being continuously fed, it becomes possible to readily produce a uniform, high-quality hologram having a large area. Thus, it is possible to provide a hologram producing method which gives a high yield and is suitable for mass-production.

Further, a surface of the transparent member that is brought into close contact with the recording film is convexly curved only in the direction of feed of the recording film, and the space between the recording film contact surface and the recording film is filled with an index matching liquid so that the recording film is brought into close contact with the transparent member through the index matching liquid. Therefore, the condition of contact between the recording film and the transparent member improves, so that the recording film moves smoothly when fed. Accordingly, the recording film will not be flawed by contact with the contact surface of the transparent member, and no air bubbles will get mixed in the index matching liquid. Thus, the thickness of the index matching liquid can be made small and uniform. In addition, the reverse surface of the recording film will not be contaminated with the index matching liquid, and the recording film can be uniformly irradiated with the incident light beam and the reflected light beam. Accordingly, it is possible to continuously record a uniform, excellent hologram having a large area. Furthermore, interference fringes can be formed in the recording film such that a large number of interference fringes slightly different in the angle of inclination are superimposed one on top of another by virtue of the configuration of the contact surface of the transparent member. Therefore, a holographic mirror thus recorded in the recording film provides a diffraction spectrum which is not a line spectrum but a broad band spectrum. Accordingly, it is possible to obtain a holographic mirror suitable for a solar reflector of the like which reflects light only in the infrared region.

If a surface of the recording film that will not come in contact with the transparent member is formed with a layer having a thickness distribution in a direction perpendicular to the direction of feed of the recording film so that the incident light beam is reflected at this layer, it is possible to form interference fringes inclined with respect to the surface of the recording film. Thus, the method is suitable for production of a solar reflector or the like.

If surfaces of the transparent member, exclusive of the light beam incidence surface and the recording film contact surface, have previously been subjected to a light-absorbing treatment, it is possible to prevent irregular reflection and to minimize the disorder of interference fringes. In addition, no light will impinge on portions of the recording film other than the exposed portion thereof. Thus, it becomes unnecessary to install a large-sized light-shielding plate.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

The hologram recording method of the present invention will be described below more specifically by way of preferred embodiments.

Figure 1:
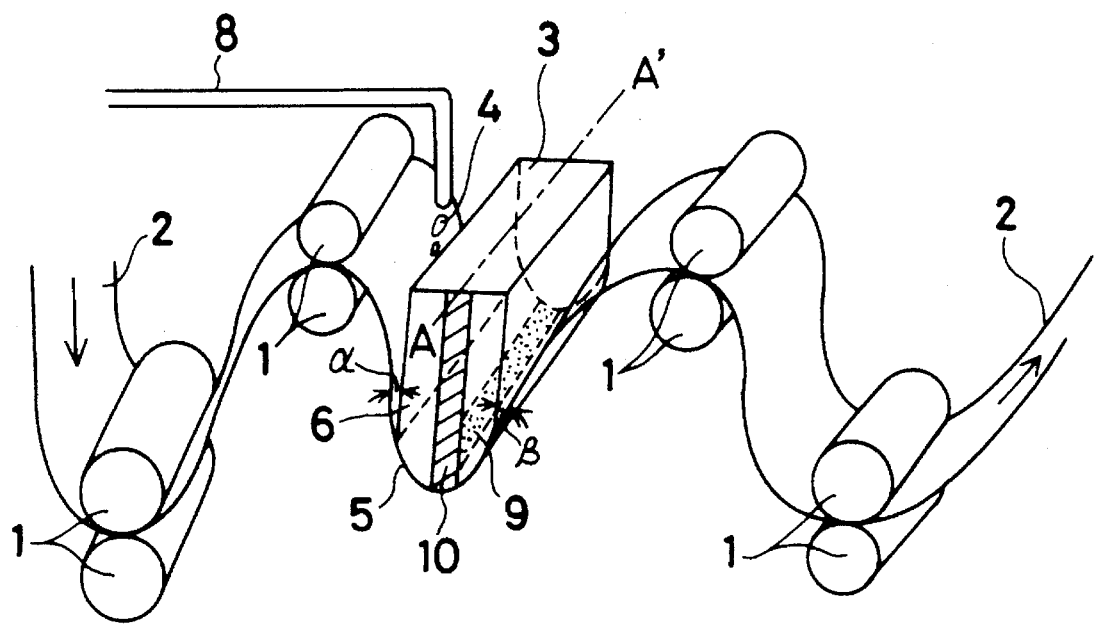
FIG. 1 shows one form of arrangement for carrying out the hologram recording method of the present invention.

FIG. 1 shows one example of a system arrangement for carrying out the hologram recording method of the present invention. In FIG. 1, reference numeral 1 denotes a series of rolls, 2 a recording film, and 3 a transparent member. The series of rolls 1 feeds the recording film 2 to the transparent member 3. A feed nozzle 8 supplies the recording film 2 with an index matching liquid 4 upstream the transparent member 3. The transparent member 3 has a contact surface 5 with which the recording film 2 is brought into close contact through the index matching liquid 4.

Figure 2:
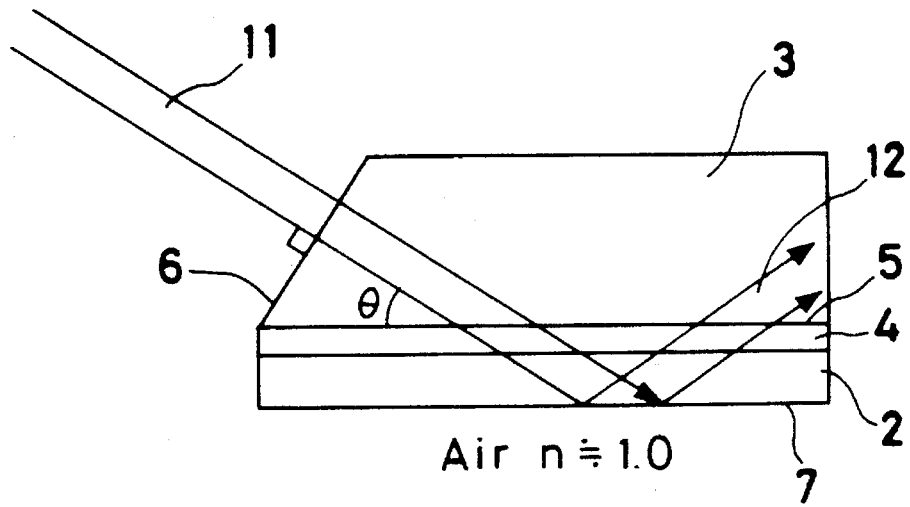
FIG. 2 shows a cross-section of a transparent member which is perpendicular to the direction of movement of a recording film.

FIG. 2 is a sectional view taken along the line A—A' in FIG. 1. In FIGS. 1 and 2, the same reference numerals denote the same elements or portions. Referring to these figures, the transparent member 3 has a light beam incidence surface 6 provided on one side thereof at a predetermined angle to the contact surface 5. Reference numeral 11 denotes a linear incident light beam. Reference numeral 7 denotes the other surface of the recording film 2 that is not in contact with the transparent member 3, and 12 a reflected light beam.

Although not shown, surfaces of the transparent member 3, exclusive of the light beam incidence surface 6 and the recording film contact surface 5, are light-absorbing surfaces, and portions of the recording film 2 other than a portion thereof where interference is to be caused are shielded from light.

In the above-described arrangement, the light beam 11 is made incident substantially normally on the incidence surface 6. If the angle between the incident light beam 11 and the normal to the incidence surface 6 is large, reflection occurs at the incidence surface 6, causing the light beam utilization efficiency to be lowered. Therefore, the angle of the incident light beam 11 to the normal to the incidence surface 6 is preferably in the range of from 0° to 10°. The incident light beam 11 rectilinearly propagates through the transparent member 3 and reaches the contact surface 5. The refractive indices of the recording film 2, the transparent member 3 and the index matching liquid 4 are approximately equal to each other. Consequently, the incident light beam 11 enters the recording film 2 without reflecting at the interface between the contact surface 5 and the index matching liquid 4 or at the interface between the index matching liquid 4 and the recording film 2 and impinges on the other surface 7 of the recording film 2. If the angle 8 between the incident light beam 11 and the contact surface 5 of the transparent member 3 is small, the incident light beam 11 totally reflects at the interface between the surface 7 of the recording film 2, which is not in contact with the transparent member 3, and the air (n≈1.0), so that the incident light beam 11 and the reflected light beam 12 interfere with each other in the recording film 2. Thus, interference fringes are formed and recorded in the recording film 2.

In the example shown in FIG. 1, the contact surface 5 of the transparent member 3 has a convex cylindrical configuration. Accordingly, the recording film 2 can be brought into close contact with the transparent member 3 under favorable conditions with the index matching liquid 4 interposed therebetween, so that the recording film 2 can move smoothly when fed without being flawed by contact with the contact surface 5 of the transparent member 3 and no air bubbles will get mixed in the index matching liquid 4. Thus, the thickness of the index matching liquid 4 can be made small and uniform. In addition, the reverse surface 7 of the recording film 2 will not be contaminated with the index matching liquid 4, and the recording film 2 can be uniformly irradiated with the incident light beam 11 and the reflected light beam 12. Accordingly, it is possible to continuously record a uniform, excellent hologram having a large area. For this purpose, it is generally preferable that the curvature radius of the cylindrical contact surface 5 should be in the range of from 10 mm to 100 mm, and that the tension applied to the recording film 2 should be in the range of from 10 kg/m to 50 kg/m, and further that the thickness of the index matching liquid 4 should be not larger than 500 µm. Furthermore, the angle $\alpha$ (see FIG. 1) made between one side surface of the transparent member 3 and the recording film 2 when the recording film 2 comes in contact with the contact surface 5 and the angle $\beta$ (see FIG. 1) made between another side surface of the transparent member 3 and the recording film 2 when the recording film 2 comes out of the contact with the contact surface 5 are both preferably in the range of from 5° to 45°. In addition, the size of the incident light beam 11, which has a linear cross-sectional configuration, in the direction of feed of the recording film 2 is preferably not larger than 3 mm with regard to beam sizes which provide at least $1/e^2=13.5\%$ of the maximum intensity.

As has been described above, the transparent member 3 is preferably made of a material having a refractive index close to that of the recording film 2. Since the refractive index of the recording film 2 is generally in the range of from 1.3 to 1.7, it is possible to use glass, a plastic material, or an inorganic substance as a material for the transparent member 3, as described later. It should be noted that since the recording film 2 is exposed to a linear light beam applied perpendicularly to the direction of feed of the recording film 2, the exposure is not substantially affected by vibration; however, if the beam irradiation time is long, glass, which has sufficiently large mass and is not readily vibrated, is preferably used as a material for the transparent member 3.

Figure 16A:
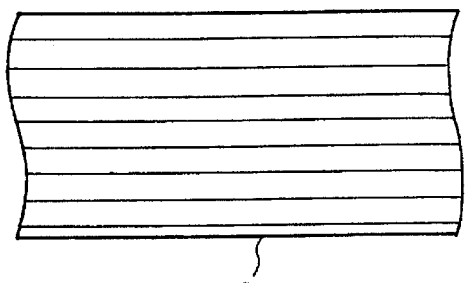
FIG. 16(a) schematically shows a configuration of holographic interference fringes which have a cross-section perpendicular to the direction of movement of the recording film and which are recorded by the device shown in FIGS. 1 and 2.
Figure 16B:
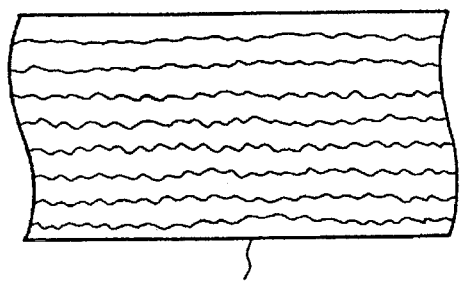
FIG. 16(b) schematically shows a configuration of holographic interference fringes which have a cross-section parallel to the direction of movement of the recording film and which are recorded by the device shown in FIGS. 1 and 2.

Thus, in the present invention, the recording film 2 is subjected to linear exposure while being continuously fed in close contact with the convex cylindrical contact surface 5 of the transparent member 3. Accordingly, it is only necessary for the transparent member 3 to have a size required for the linear exposure, which is smaller than that in the case of planar exposure. Thus, the transparent member 3 is small in size and light in weight and also less costly. In addition, since exposure can be effected with the recording film 2 brought into close contact with the transparent member 3 under favorable conditions, it is possible to realize a hologram of large area and uniform quality. Since a linear light beam is used, there is substantially no effect of vibration on the exposure. Furthermore, since the surface 7 of the recording film 2 that totally reflects the incident light beam 11 becomes a convex cylindrical surface along the contact surface 5 of the transparent member 3, the reflected light beam 12 is not a parallel light beam but a slightly converging light beam. Accordingly, interference fringes formed by interference between the incident light beam 11 and the reflected light beam 12 have a configuration wherein a large number of interference fringes slightly different in the angle of inclination are superimposed one on top of another. FIG. 16(a) and 16(b) shows schematically configurations of interference fringes in cross-sections perpendicular and parallel, respectively, to the direction of movement of the recording film 2 in a hologram recorded by the arrangement shown in FIGS. 1 and 2. As will be clear from the figure, the hologram recorded by the above-described method of the present invention contains equally spaced interference fringes recorded in the recording film 2 in parallel to either direction of the plane of the film 2. However, the disorder of the interference fringes in the cross-section parallel to the direction of movement of the recording film 2 is larger than that of the interference fringes in the cross-section perpendicular to the direction of movement of the recording film 2. This is the effect produced by the above-described recording along the convex cylindrical surface. A holographic mirror produced in this way provides a diffraction spectrum which is not a line spectrum but a broad band spectrum due to the disorder of the interference fringes and is therefore suitable for a solar reflector or the like which reflects light only in the infrared region.

Figure 3:
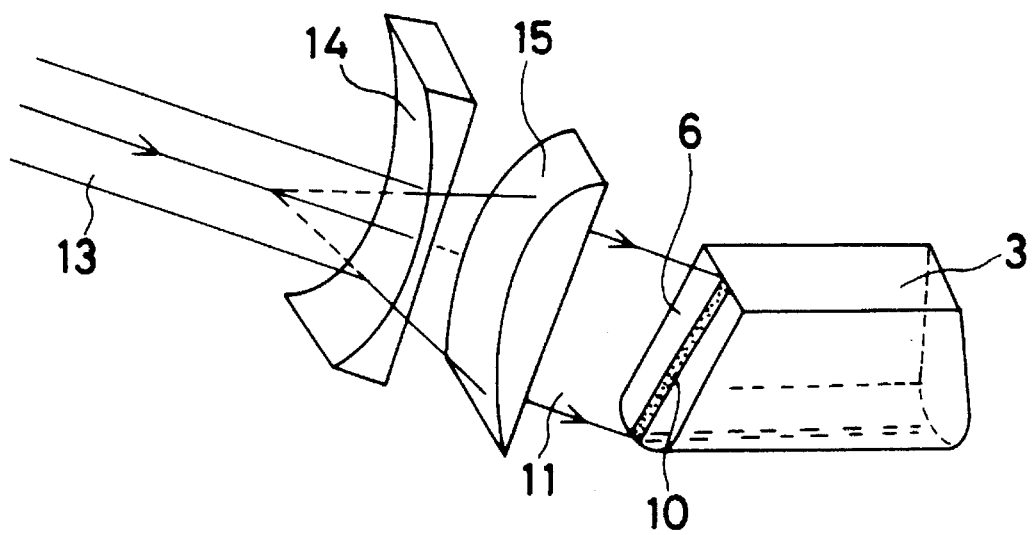
FIG. 3 shows one example of an optical system for forming a linear light beam.

It should be noted that in FIG. 1 reference numeral 9 denotes a linear exposure region, and 10 an incidence region of the incidence surface 6 on which the incident light beam 11 is incident. The incident light beam 11 may be formed, for example, by an arrangement as shown in FIG. 3. That is, a narrow laser beam 13 is passed through a plano-concave cylindrical lens 14 and a plano-convex cylindrical lens 15, which are disposed in confocal relation to each other, so that the laser beam 13 is enlarged in one direction.

As shown in FIG. 2, the incident light beam 11 enters the incidence surface 6 of the transparent member 3 at substantially right angles thereto through the incidence region 10 and is reflected at the other surface 7 of the recording film 2. If reflection occurs elsewhere than the surface 7, the reflected light undesirably enters the recording film 2 and disorders the interference fringes. Therefore, surfaces of transparent member 3, exclusive of the incidence surface 6 and the contact surface 5, have previously been subjected to a light-absorbing treatment, thereby preventing irregular reflection. Thus, it is possible to prevent light from undesirably entering an unexposed or exposed portion of the recording film 2 and to thereby prevent the interference fringes from being disordered without the need for installing a large-sized light-shielding plate.

The difference in refractive index between the recording film 2, the transparent member 3 and the index matching liquid 4 is preferably not larger than 0.2, more preferably not larger than 0.1, in the temperature range of from 15° C. to 25° C. Specific examples of the material of the transparent member 3 are as follows: When the principal component of the recording film 2 is a polyvinyl carbazole derivative, the transparent member 3 is preferably made of F2 glass, a polyester resin, an allyl resin having a high refractive index, an acrylic resin having a high refractive index, etc. When the principal component of the recording film 2 is a polyvinyl acetate derivative, the transparent member 3 is preferably made of BK-7 glass, quartz glass, etc. When the principal component of the recording film 2 is a polyester, the transparent member 3 is preferably made of F2 glass or the like.

Figure 4:
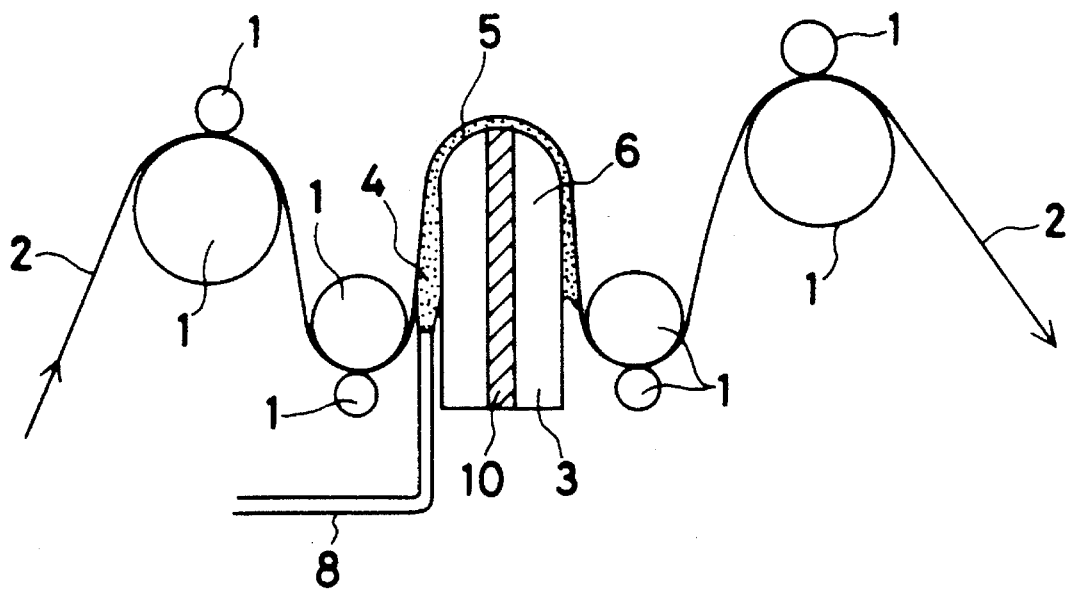
FIG. 4 shows another form of arrangement for carrying out the hologram recording method of the present invention.

The arrangement of the present invention may also be such that a transparent member 3 which is similar to the above is disposed at the lower side of the recording film 2, as shown in FIG. 4. In the arrangement shown in FIG. 4, the recording film 2 winds on the convex cylindrical contact surface 5 of the transparent member 3 through the index matching liquid 4 in the same way as in the case of the arrangement shown in FIG. 1. Therefore, if tension is applied to the recording film 2 by two pairs of rolls 1 respectively disposed upstream and downstream the transparent member 3 so that the recording film 2 presses the transparent member 3 from above it, the condition of contact between the transparent member 3 and the recording film 2 is improved, and unnecessary stray light can be eliminated. Thus, a hologram of good quality can be produced. In this case also, it is preferable that surfaces of the transparent member 3, exclusive of the light beam incidence surface 6 and the contact surface 5, have previously been subjected to a light-absorbing treatment.

Figure 5:
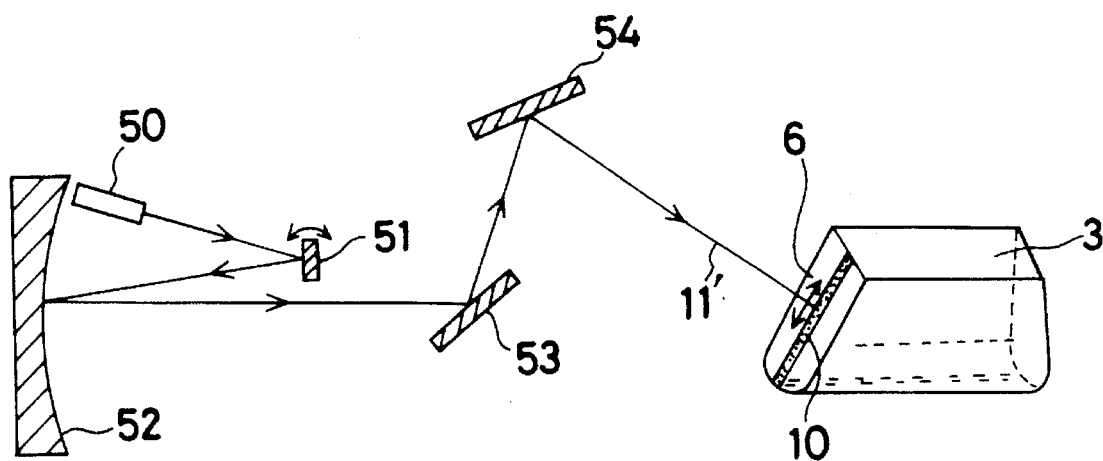
FIG. 5 shows one example of an optical system for forming a scanning light beam.

In the foregoing arrangements, the linear incident light beam 11 formed by an optical system as shown in FIG. 3 is made incident on the incidence surface 6 of the transparent member 3 to irradiate the linear exposure region 9 simultaneously at all times. However, it is also possible to irradiate the linear exposure region 9 with a scanning light beam reciprocating at high speed. FIG. 5 shows one example of an optical system which may be used for this purpose in place of the optical system shown in FIG. 3. In this optical system, laser light oscillated from a laser light source 50 is deflected by a galvanomirror 51 and converted into a parallel-moving scanning beam by a parabolic mirror 52. Then, the beam is reflected by mirrors 53 and 54 so as to enter the linear incidence region 10 on the incidence surface 6 of the transparent member 3 as a scanning light beam 11' reciprocating as shown by the double-head arrow in the figure. Accordingly, the scanning light beam 11' is applied substantially perpendicularly to the direction of movement of the recording film 2, and the incident light beam 11' is totally reflected at the other surface 7 of the recording film 2 so that the incident light beam 11' and the reflected light beam interfere with each other in the recording film 2, thereby sequentially recording interference fringes in the transverse direction of the recording film 2.

The merit of using the reciprocating scanning light beam 11' is as follows. When a light beam 11 linearly enlarged by using an optical system as shown in FIG. 3 is employed, the light intensity at an end portion is weaker than that in the central portion, resulting in non-uniformity of light intensity in the recording plane, whereas, when a scanning light beam 11' as shown in FIG. 5 is employed, such non-uniformity of light intensity in the recording plane does not occur. It is necessary in order to realize such uniform exposure to allow the recording film 2 to move only a distance shorter than a half of the width of the beam 11' during one reciprocation of the beam 11'. That is, it is necessary to satisfy the following relationship:

$$2d/s \leq c/2a$$

where c is the width of the beam 11', s is the scanning speed, d is the width of the recording film 2, and a is the feed speed.

Figure 15:
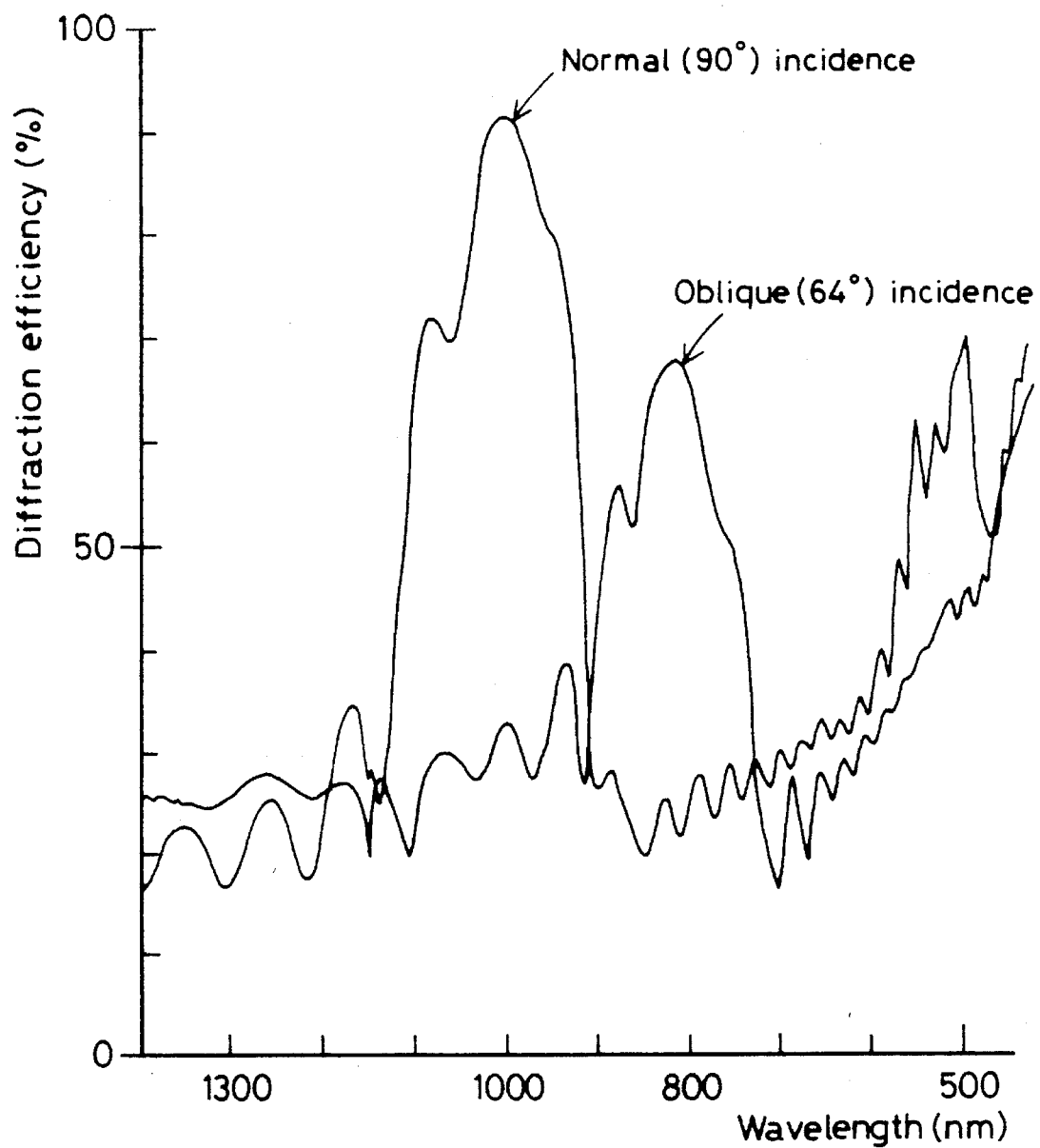
FIG. 15 is a graph showing an example of measurement of the diffraction efficiency obtained from a volume hologram.

Incidentally, a holographic mirror produced by the above method has interference fringes parallel to the surface of the recording film. However, when such a holographic mirror is pasted on a window glass, for example, to use it as a solar reflector for reflecting infrared rays, it is preferable for the interference fringes to be inclined at a desired angle to the surface of the recording film. FIG. 15 shows a specific example of measurement of the diffraction efficiency obtained from a volume hologram comprising parallel interference fringes. When light is incident obliquely (64°) on the interference fringes, the diffraction efficiency becomes lower than in the case of the normal incidence (90°) on the interference fringes, and the diffraction wavelength undesirably shifts toward the short wavelength side. It can be said that this phenomenon generally occurs from the theory of diffraction. Accordingly, in the case of a window on which sunlight is obliquely incident from above it, it is preferable, with a view to reflecting and diffracting the desired wavelength as designed and at high diffraction efficiency, to enable interference fringes to be recorded at an angle to the surface of the recording film so that the interference fringes are perpendicular to the incident light.

Figure 6:
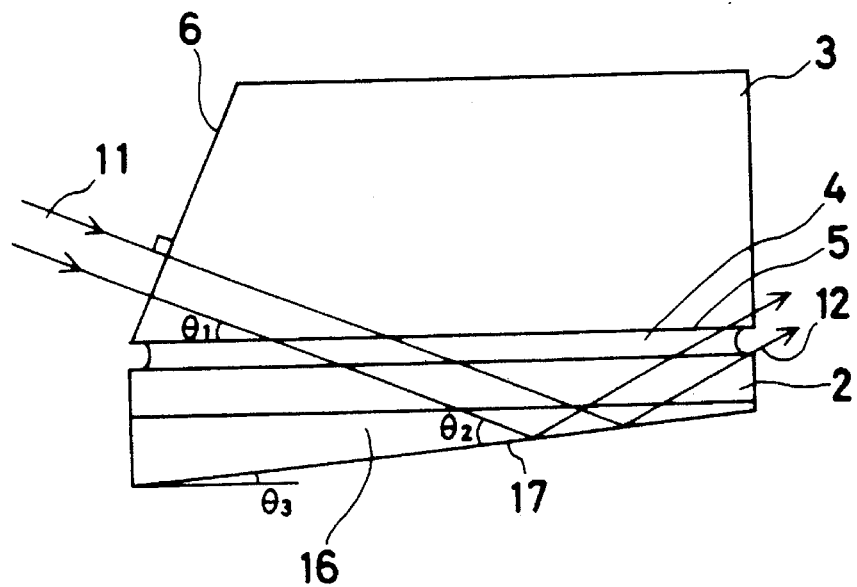
FIG. 6 is a sectional view similar to FIG. 2, showing a form for recording inclined interference fringes.

FIG. 6 is a sectional view similar to FIG. 2, showing one example of recording interference fringes inclined with respect to the surface of the recording film 2 as described above. The inclined interference fringes are recorded by using the system arrangement shown in FIG. 1. This example differs from the example shown in FIG. 2 only in the arrangement of the recording film 2. The second example will be explained below with reference to FIGS. 1 and 6. FIG. 6 is a sectional view taken along the line A—A' in FIG. 1. In these figures, the same reference numerals denote the same elements or portions. In FIGS. 1 and 6, the transparent member 3 is arranged as described above. The side of the recording film 2 that is reverse to the side that comes in close contact with the transparent member 3 is provided with a protective film 16 having a wedge-shaped cross-sectional configuration as shown in FIG. 6.

In the above-described arrangement, the refractive indices of the recording film 2, the protective film 16, the transparent member 3 and the index matching liquid 4 are made substantially equal to each other. Consequently, the incident light beam 11 enters the protective film 16 without reflecting at the interface between the contact surface 5 and the index matching liquid 4 or at the interface between the index matching liquid 4 and the recording film 2 or at the interface between the recording film 2 and the protective film 16 and impinges on the reverse slanted surface 17 of the protective film 16. Since the angle $\Theta_2$ between the incident light beam 11 and the reverse surface 17 of the protective film 16 is small, the incident light beam 11 is totally reflected at the interface between the surface 17 and the air (n≈1.0), so that the incident light beam 11 and the reflected light beam 12 interfere with each other in the recording film 2. Thus, interference fringes inclined with respect to the surface of the recording film 2 are produced and recorded in the film 2. In this hologram producing method, the angle $\Theta_3$ between the reverse surface 17 of the protective film 16 and the recording film 2 can be set in the range of from 0° to 10°. Accordingly, the angle of inclination of the interference fringes of a solar reflector thus produced is in the range of from 0° to 10° with respect to the surface of the recording film 2. It should be noted that if the angle $\Theta_2$ is large, aluminum or the like may be deposited on the exposed surface 17 of the protective film 16 to form a mirror reflecting layer or a holographic reflecting layer.

In this case also, the contact surface 5 of the transparent member 3 has a convex cylindrical configuration in the same way as in the arrangement shown in FIG. 2. Accordingly, the recording film 2 can be brought into close contact with the transparent member 3 under favorable conditions with the index matching liquid 4 interposed therebetween, so that the recording film 2 can move smoothly when fed without being flawed by contact with the contact surface 5 of the transparent member 3 and no air bubbles will get mixed in the index matching liquid 4. Thus, the thickness of the index matching liquid 4 can be made small and uniform. In addition, the reverse surface 7 of the recording film 2 will not be contaminated with the index matching liquid 4, and the recording film 2 can be uniformly irradiated with the incident light beam 11 and the reflected light beam 12. Accordingly, it is possible to continuously record a uniform, excellent hologram having a large area. Furthermore, it is only necessary for the transparent member 3 to have a size required for the linear exposure, which is smaller than that in the case of planar exposure. Thus, the transparent member 3 is small in size and light in weight and also less costly. In addition, since a linear light beam is used, there is substantially no effect of vibration on the exposure. Furthermore, since the reverse surface 17 of the protective film 16 that totally reflects the incident light beam 11 becomes a convex cylindrical surface along the contact surface 5 of the transparent member 3, the reflected light beam 12 is not a parallel light beam but a slightly converging light beam. Accordingly, interference fringes formed by interference between the incident light beam 11 and the reflected light beam 12 have a configuration wherein a large number of interference fringes slightly different in the angle of inclination are superimposed one on top of another. FIG. 16(b) shows schematically configurations of interference fringes in cross-sections perpendicular and parallel, respectively, to the direction of movement of the recording film 2 in a hologram recorded by the arrangement shown in FIGS. 1 and 6. As will be clear from the figure, the hologram recorded by the above-described method of the present invention contains equally spaced interference fringes recorded in the recording film 2 in parallel to the film plane in the direction of movement of the recording film 2 but at an angle to the plane of the recording film 2 in the direction perpendicular to the direction of movement of the recording film 2. Further, the disorder of the interference fringes in the cross-section parallel to the direction of movement is larger than that of the interference fringes in the cross-section perpendicular to the direction of movement of the recording film 2. This is the effect produced by the above-described recording along the convex cylindrical surface. A holographic mirror produced in this way provides a diffraction spectrum which is not a line spectrum but a broad band spectrum due to the disorder of the interference fringes and is therefore suitable for a solar reflector or the like which reflects light only in the infrared region.

Incidentally, the protective film 16 having a wedge-shaped cross-sectional configuration may be formed on one surface of the recording film 2 by any of various methods, for example, a method wherein a liquid is coated and dried on the surface of the recording film 2 such that the desired film thickness distribution is attained, and a method wherein a film having the desired thickness distribution is pasted on the surface of the recording film 2. There are various types of method of coating the surface of the recording film 2 with a liquid with the desired film thickness distribution, for example, a die coating method wherein the slit width is varied in conformity to the desired film thickness distribution pattern, a die coating method wherein the feed rate is varied in conformity to the desired film thickness distribution pattern by controlling the applied pressure, a method wherein after being subjected to dip coating, the base material is horizontally transported in an erected position with one side edge thereof facing downward so that the thickness of the applied coating liquid gradually increases toward the lower edge, and a method wherein a coating liquid is poured on the base material placed in an erected position and the base material is horizontally transported so that the thickness of the applied coating liquid gradually increases toward the lower edge of the base material. Any of these methods may be employed, provided that optimal conditions are set to obtain an appropriate film thickness distribution. Important factors are the viscosity of the coating liquid and the drying rate. In the case of die coating, the viscosity of the coating liquid is preferably not lower than 100 cps, and drying is preferably effected by heat immediately after the coating liquid has passed through the slit. If heated air is strongly applied to the coating, the film surface is disordered. Therefore, an infrared heater is preferably used jointly with heated air with a view to enhancing the drying effect.

It should be noted that if the angle of incidence of the light beam 11 on the surface 17 of the protective film 16 is 60° or more with respect to the normal, the incident light beam 11 totally reflects at the interface between the protective film 16 and the air as long as the refractive index of the protective film 16 is 1.15, and it is therefore possible to record interference fringes satisfactorily. However, it is necessary in order to prevent total reflection at the interface between the recording film 2 and the protective film 16 that the relationship between the refractive index $n_1$ of the recording film 2 and the refractive index $n_2$ of the protective film 16 satisfy the condition of $n_2/n_1 \geq 0.866$ from Snell's law. More specifically, it is possible to use as a material for the protective film 16 an aqueous solution of polyvinyl alcohol (the refractive index can be adjusted in the range of from 1.494 to 1.557 by controlling the degree of saponification), a poly(p-hydroxystyrene) or styrene solution, a polyester film, an ethylene-vinyl acetate copolymer film, etc.

Figure 7:
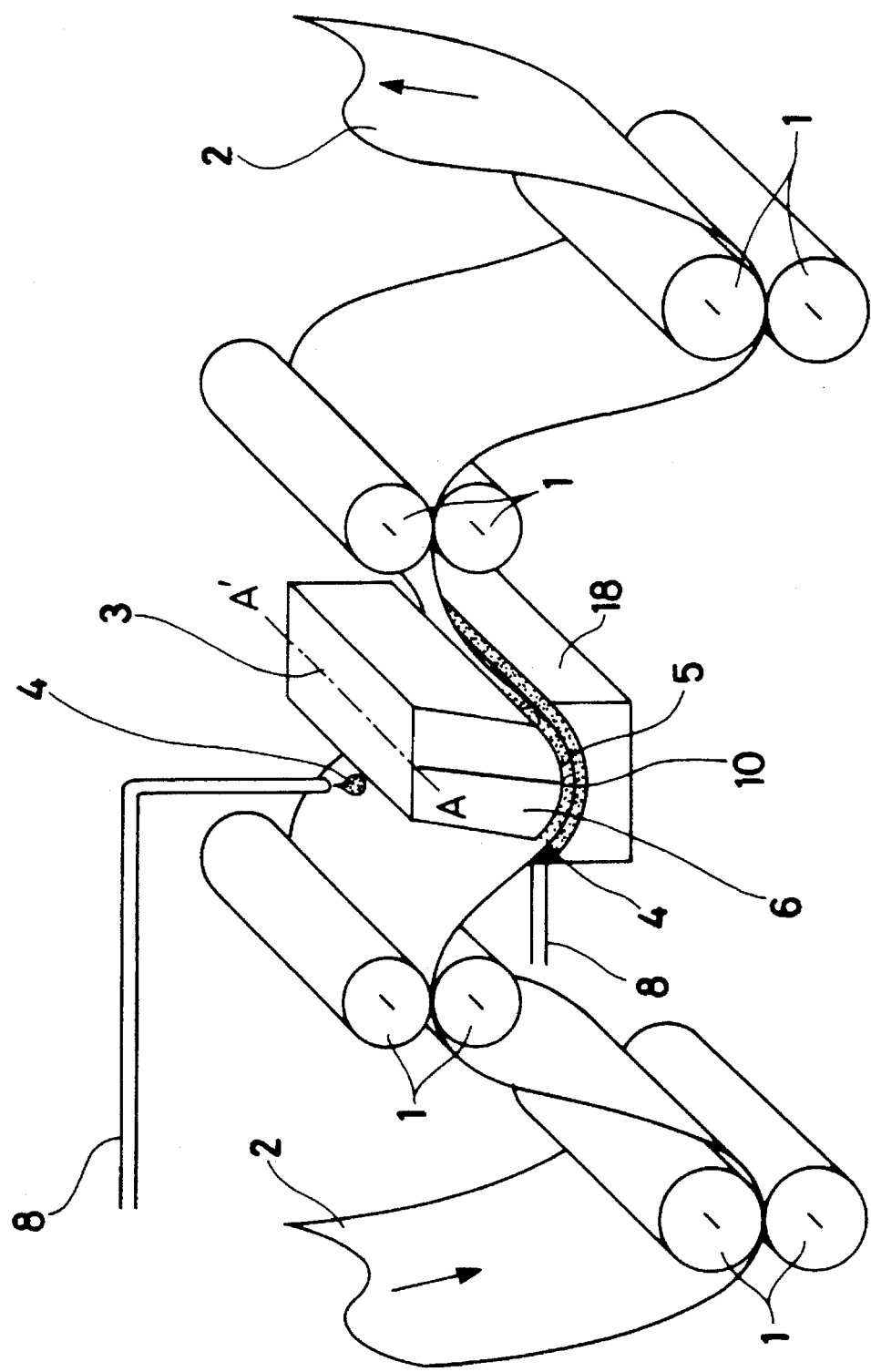
FIG. 7 shows still another form of arrangement for carrying out the hologram recording method of the present invention.

Next, another example of recording interference fringes inclined with respect to the surface of the recording film 2 will be explained with reference to FIGS. 7 to 9. FIG. 7 shows one example of a system arrangement for carrying out this recording method. In FIG. 7, reference numeral 1 denotes a series of rolls, 2 a recording film, 3 a transparent member, and 18 a reflector. The series of rolls 1 feeds the recording film 2 to the space between the transparent member 3 and the reflector 18. A feed nozzle 8 supplies the recording film 2 with an index matching liquid 4 upstream the transparent member 3 and the reflector 18. Reference numeral 5 denotes contact surfaces of the transparent member 3 and the reflector 18 with which the recording film 2 is brought into close contact through the index matching liquid 4.

Figure 8:
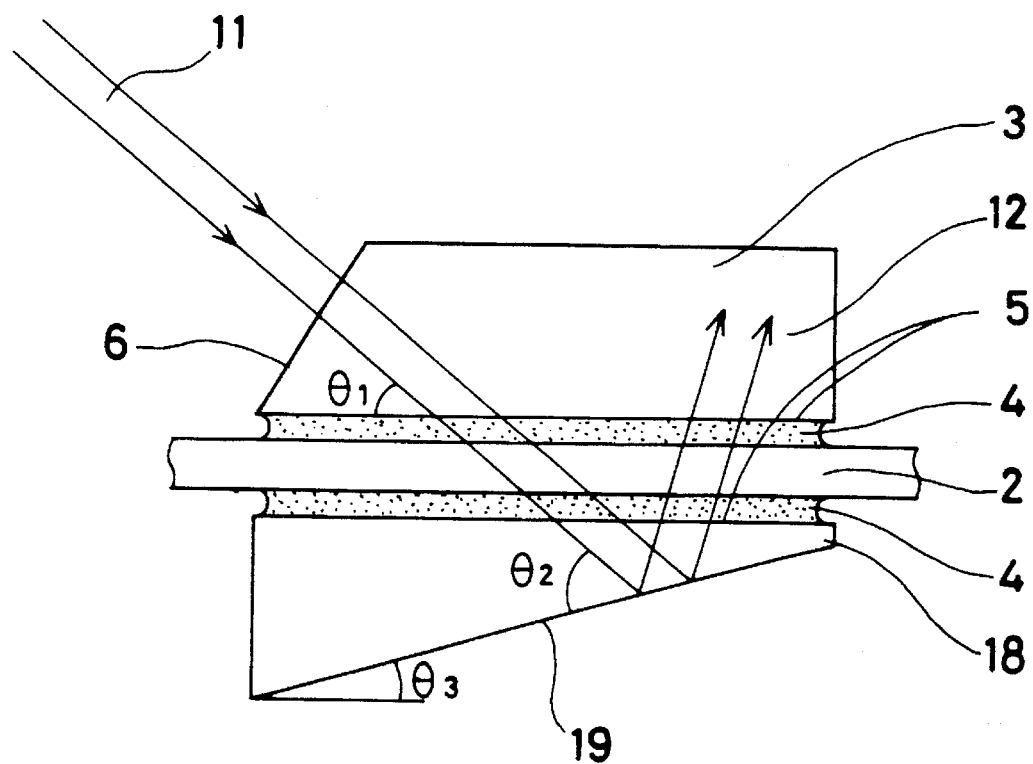
FIG. 8 shows a cross-section of a transparent member in the arrangement shown in FIG. 7, which is perpendicular to the direction of movement of a recording film.

FIG. 8 is a sectional view taken along the line A—A' in FIG. 7. Referring to FIGS. 7 and 8, the transparent member 3 has a light beam incidence surface 6 provided on one side thereof at a predetermined angle to the contact surface 5. Reference numeral 11 denotes a linear incident light beam. The reflector 18 has a reflecting surface 19 provided on the bottom thereof. Reference numeral 12 denotes a reflected light beam.

Although not shown, surfaces of the transparent member 3 and the reflector 18, exclusive of the light beam incidence surface 6 and those surfaces which sandwich the recording film 2, are light-absorbing surfaces, and portions of the recording film 2 other than a portion thereof where interference is to be caused are shielded from light.

In the above-described arrangement, the light beam 11 is made incident substantially normally on the incidence surface 6. If the angle between the incident light beam 11 and the normal to the incidence surface 6 is large, reflection occurs at the incidence surface 6, causing the light beam utilization efficiency to be lowered. Therefore, the angle of the incident light beam 11 to the normal to the incidence surface 6 is preferably in the range of from 0° to 10°. The incident light beam 11 rectilinearly propagates through the transparent member 3 and reaches the contact surface 5. The refractive indices of the recording film 2, the transparent member 3, the reflector 18 and the index matching liquid 4 are approximately equal to each other. Consequently, the incident light beam 11 enters the recording film 2 without reflecting at the interface between the contact surface 5 and the index matching liquid 4 or at the interface between the index matching liquid 4 and the recording film 2 and passes through the index matching liquid 4 at the other side of the film 2 and also through the reflector 18. If the angle $\Theta_2$ between the incident light beam 11 and the reflecting surface 19 of the reflector 18 is small, the incident light beam 11 totally reflects at the interface between the reflecting surface 19 and the air, so that the incident light beam 11 and the reflected light beam 12 interfere with each other in the recording film 2. Thus, interference fringes are formed and recorded in the film 2. If the angle $\Theta_2$ is large, aluminum or the like may be deposited on the reflecting surface 19 of the reflector 18 to form a mirror reflecting layer or a holographic reflecting layer.

Figure 16C:
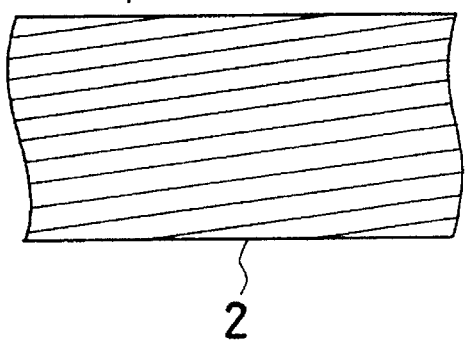
FIG. 16(c) schematically shows a configuration of holographic interference fringes which have a cross-section perpendicular to the direction of movement of the recording film and which are recorded by the device shown in FIGS. 1 and 6.
Figure 16D:
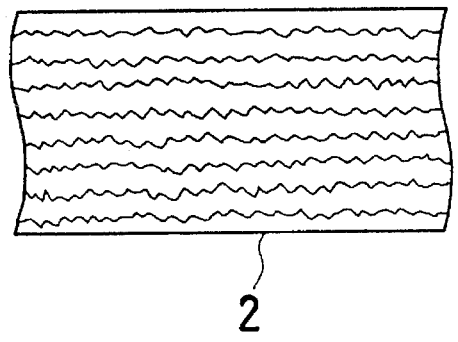
FIG. 16(d) schematically shows a configuration of holographic interference fringes which have a cross-section parallel to the direction of movement of the recording film and which are recorded by the device shown in FIGS. 1 and 6.
Figure 17:
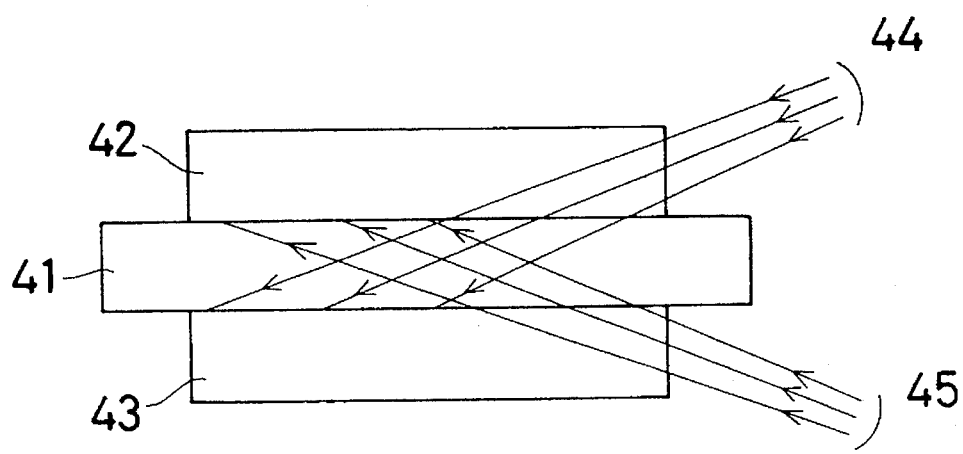
FIG. 17 is a view for explanation of a conventional hologram recording method.
Figure 18:
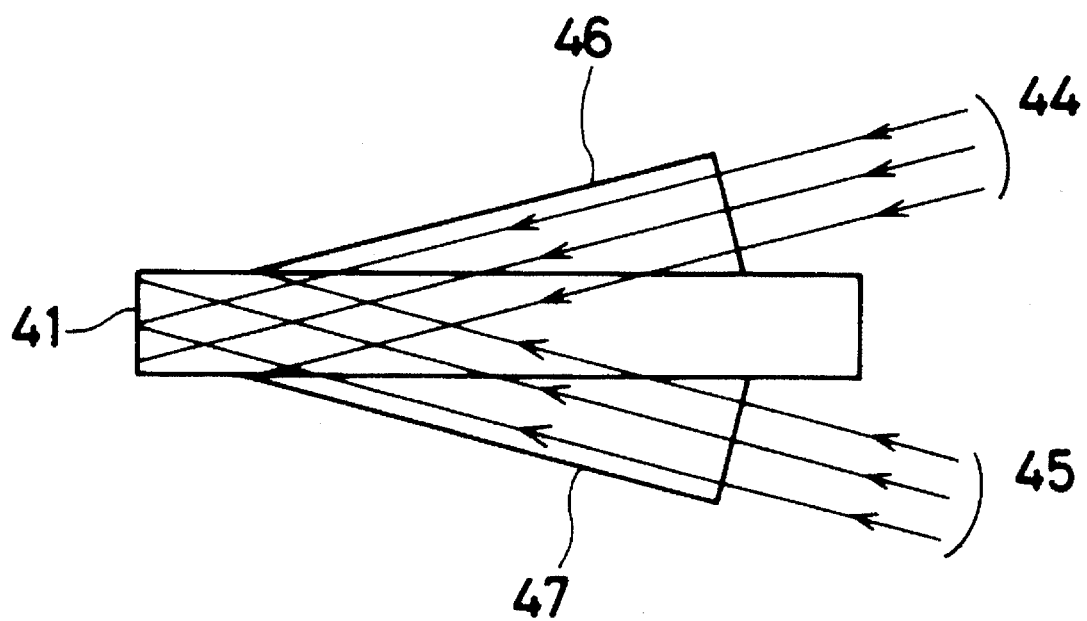
FIG. 18 is a view for explanation of another conventional hologram recording method.

In the example shown in FIG. 7 and 8, the contact surface 5 of the transparent member 3 has a convex cylindrical configuration, and the contact surface 5 of the reflector 18 has a concave cylindrical configuration conformable to the convex cylindrical contact surface 5 of the transparent member 3. Accordingly, the recording film 2 can be brought into close contact with the transparent member 3 and the reflector 18 under favorable conditions with the index matching liquid 4 interposed therebetween, so that the recording film 2 can move smoothly when fed without being flawed by contact with the contact surfaces 5 and no air bubbles will get mixed in the index matching liquid 4. Thus, the thickness of the index matching liquid 4 can be made small and uniform. In addition, the reverse surface 7 of the recording film 2 will not be contaminated with the index matching liquid 4, and the recording film 2 can be uniformly irradiated with the incident light beam 11 and the reflected light beam 12. Accordingly, it is possible to continuously record a uniform, excellent hologram having a large area. Furthermore, it is only necessary for the transparent member 3 to have a size required for the linear exposure, which is smaller than that in the case of planar exposure. Thus, the transparent member 3 is small in size and light in weight and also less costly. In addition, since a linear light beam is used, there is substantially no effect of vibration on the exposure. Furthermore, if the reflecting surface 19 that reflects the incident light beam 11 is formed in a convex cylindrical shape along the contact surfaces 5, the reflected light beam 12 becomes not a parallel light beam but a slightly converging light beam. Accordingly, interference fringes formed by interference between the incident light beam 11 and the reflected light beam 12 have a configuration wherein a large number of interference fringes slightly different in the angle of inclination are superimposed one on top of another, as shown in FIG. 16(c). Accordingly, a holographic mirror obtained in this way also provides a diffraction spectrum which is not a line spectrum but a broad band spectrum due to the disorder of the interference fringes caused by the cylindrical surface and is therefore suitable for a solar reflector or the like which reflects light only in the infrared region.

As has been described above, the transparent member 3 and the reflector 18 are preferably made of a material having a refractive index close to that of the recording film 2. Since the refractive index of the recording film 2 is generally in the range of from 1.3 to 1.7, it is possible to use glass, a plastic material, or an inorganic substance as a material for the transparent member 3 and the reflector 18. It should be noted that since the recording film 2 is exposed to a linear light beam applied perpendicularly to the direction of feed of the recording film 2, the exposure is not substantially affected by vibration; however, if the beam irradiation time is long, glass, which has sufficiently large mass and is not readily vibrated, is preferably used as a material for the transparent member 3 and the reflector 18.

Thus, in this example, the recording film 2 is subjected to linear exposure while being continuously fed in close contact with the contact surfaces 5 of the transparent member 3 and the reflector 18, which sandwich the recording film 2 from the upper and lower sides thereof. Accordingly, it is only necessary for the transparent member 3 and the reflector 18 to have a size required for the linear exposure, which is smaller than that in the case of planar exposure. Thus, the transparent member 3 and the reflector 18 are small in size and light in weight and also less costly. In addition, since exposure can be effected with the recording film 2 brought into close contact with the transparent member 3 and the reflector 18 under favorable conditions, it is possible to realize a hologram of large area and uniform quality. Since a linear light beam is used, there is substantially no effect of vibration on the exposure.

It should be noted that in FIG. 7 reference numeral 10 denotes an incidence region of the incidence surface 6 on which the linear incident light beam 11 is incident. The incident light beam 11 may be formed, for example, by an arrangement as shown in FIG. 3. That is, a narrow laser beam 13 is passed through a plano-concave cylindrical lens 14 and a plano-convex cylindrical lens 15, which are disposed in confocal relation to each other, so that the laser beam 13 is enlarged in one direction.

As shown in FIG. 8, the incident light beam 11 enters the incidence surface 6 of the transparent member 3 at substantially right angles thereto through the incidence region 10 and is reflected at the interface between the reflecting surface 19 of the reflector 18 and the air or the mirror surface. If reflection occurs elsewhere than the reflecting surface 19 of the reflector 18, the reflected light undesirably enters the recording film 2 and disorders the interference fringes. Therefore, surfaces of transparent member 3 and the reflector 18, exclusive of the incidence surface 6 and the contact surfaces 5, have previously been subjected to a light-absorbing treatment, thereby preventing irregular reflection. Thus, it is possible to prevent light from undesirably entering an unexposed or exposed portion of the recording film 2 and to thereby prevent the interference fringes from being disordered without the need for installing a large-sized light-shielding plate.

The difference in refractive index between the recording film 2, the transparent member 3, the reflector 18 and the index matching liquid 4 is preferably not larger than 0.2, more preferably not larger than 0.1, in the temperature range of from 15° C. to 25° C.

If the reflecting surface 19 is disposed not in parallel to the surface of the recording film 2 but at a predetermined angle thereto, the angle of reflection of the reflected light beam 12 can be varied. Thus, it is possible to record inclined interference fringes in the recording film 2.

Figure 9:
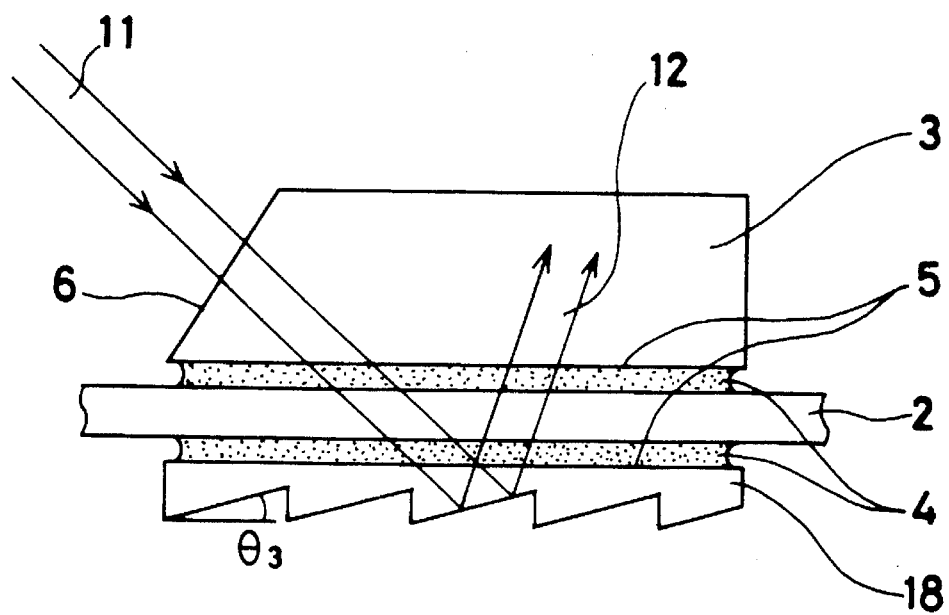
FIG. 9 shows a modification of a reflector in the arrangement shown in FIG. 8.

If the reflector 18 is formed in a staircase shape as shown in FIG. 9, it is possible to obtain an advantage in that the material cost of the reflector 18 decreases in addition to an advantageous effect similar to the above.

The same advantageous effect can also be obtained by forming on the reflecting surface 19 a holographic layer that varies the angle of reflection instead of varying the angle of the reflecting surface 19.

It should be noted that in the arrangement shown in FIG. 8 the reflector 18 is transparent because the reflecting surface 19 is the bottom surface of the reflector 18. However, the reflecting surface is not necessarily limited to the bottom surface of the reflector 18, but the contact surface 5 of the reflector 18 may be used as a reflecting surface. In such a case, the reflector 18 need not be transparent, and the reflecting surface, which is the contact surface 5 of the reflector 18, may be formed of a mirror reflecting layer or a holographic reflecting layer formed by vapor deposition of aluminum or the like. If the reflecting surface is a mirror reflecting layer formed by vapor deposition of aluminum or the like, it is possible to support the recording film 2 so as to prevent vibration due to the feed of the recording film 2, thereby avoiding an adverse effect on the recording of interference fringes. If the reflecting surface is formed of a holographic reflecting layer, it is possible to record oblique interference fringes as well as to prevent vibration.

Figure 10:
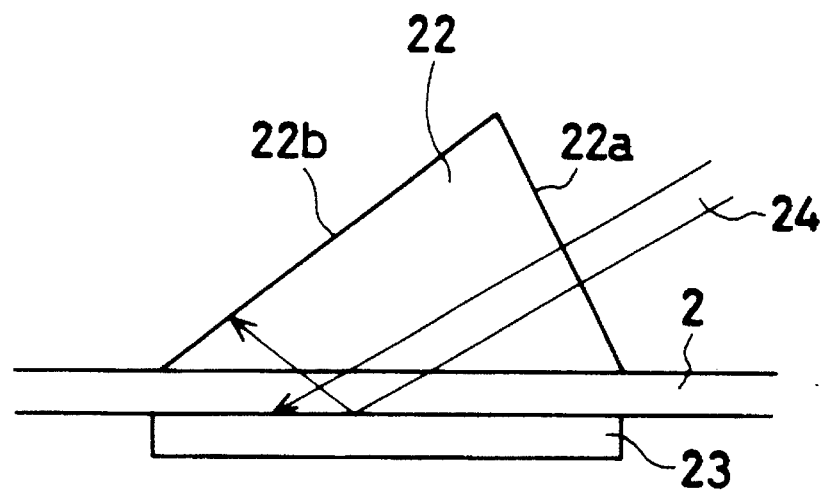
FIG. 10 is a view for explanation of another recording method of the present invention.

Next, another hologram recording method of the present invention will be explained. FIG. 10 is a view for explanation of the principle of this recording method. A transparent member 22 is brought into close contact with one surface of the recording film 2, which is successively fed, and a mirror 23 is brought into close contact with the other surface of the recording film 2 in opposing relation to the transparent member 22 across the recording film 2. In this state, a light beam 24 is made incident substantially normally on a surface 22a of the transparent member 22. The refractive indices of the transparent member 22 and the recording film 2 are approximately equal to each other. Consequently, the light beam 24 enters the recording film 2 without reflecting at the interface between the transparent member 22 and the recording film 2 and reflects at the interface between the recording film 2 and the mirror 23, so that the incident light beam and the reflected light beam interfere with each other in the recording film 2. Thus, a hologram is recorded in the recording film 2. If the recording film 2 is continuously fed, a hologram of large area can be recorded.

Figure 11:
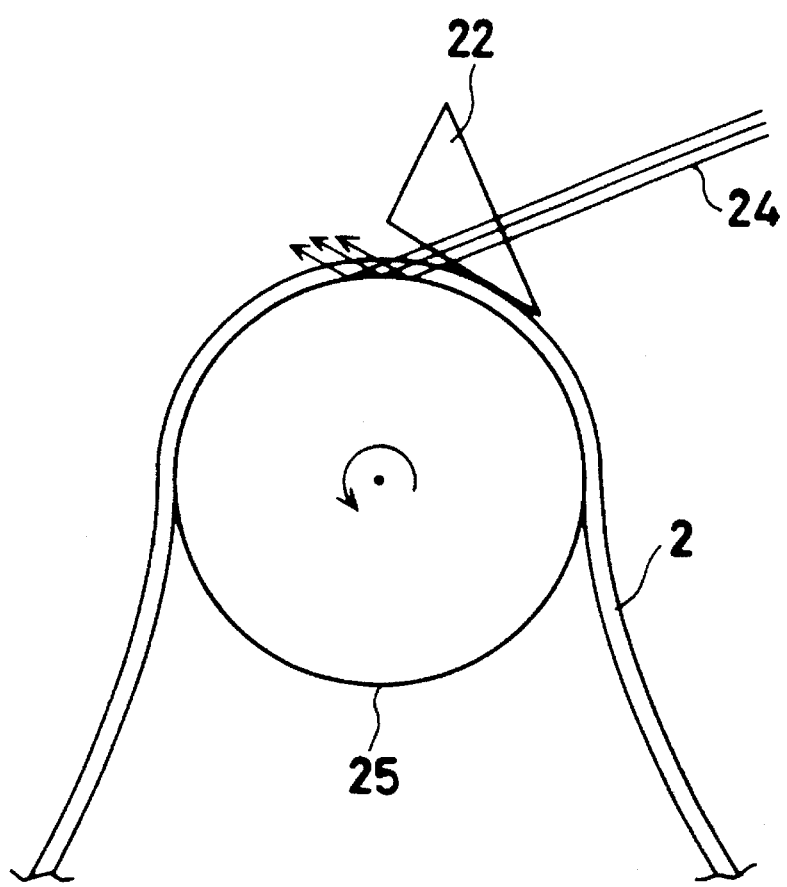
FIG. 11 is a view for explanation of the method shown in FIG. 10 in a case where it is applied to a continuous exposure, roll-feed system.

FIG. 11 is a view for explanation of a continuous exposure, roll-feed system. In the arrangement shown in FIG. 11, the recording film 2 is wound close on a mirror-finished roll 25, and the transparent member 22 is brought into close contact with the upper side of the recording film 2. In this state, the light beam 24 is made incident substantially normally on the surface 22a of the transparent member 22 and reflected at the surface of the mirror-finished roll 25, thereby causing the incident light beam and the reflected light beam to interfere with each other in the recording film 2. Thus, interference fringes are formed and recorded in the recording film 2. By continuously feeding the recording film 2, holograms can be continuously recorded.

As has been described above, the transparent member 22 is preferably made of a material having a refractive index close to that of the recording film 2. Since the refractive index of the recording film 2 is generally in the range of from 1.3 to 1.7, it is possible to use glass, a plastic material, or an inorganic substance as a material for the transparent member 3. Further, since a linear light beam is employed, the exposure is not substantially affected by vibration; however, if the beam irradiation time is long, it is preferable to use glass as a material for the transparent member 3.

Thus, in this example, the recording film 2 is subjected to linear exposure with the transparent member 22 brought into close contact with it and with the roll 25 rotated. Accordingly, the amount of transparent material required for the transparent member 22 is minimized. Thus, the transparent member 22 becomes less costly, thin, small in size and light in weight. In addition, since continuous exposure can be effected, a hologram of large area can be realized. Since linear exposure is employed, the effect of vibration is minimized. Further, since the surface of the roll 25 is mirror-finished, the transparent member 22 needs to be disposed only at one side of the recording film 2.

Figure 12:
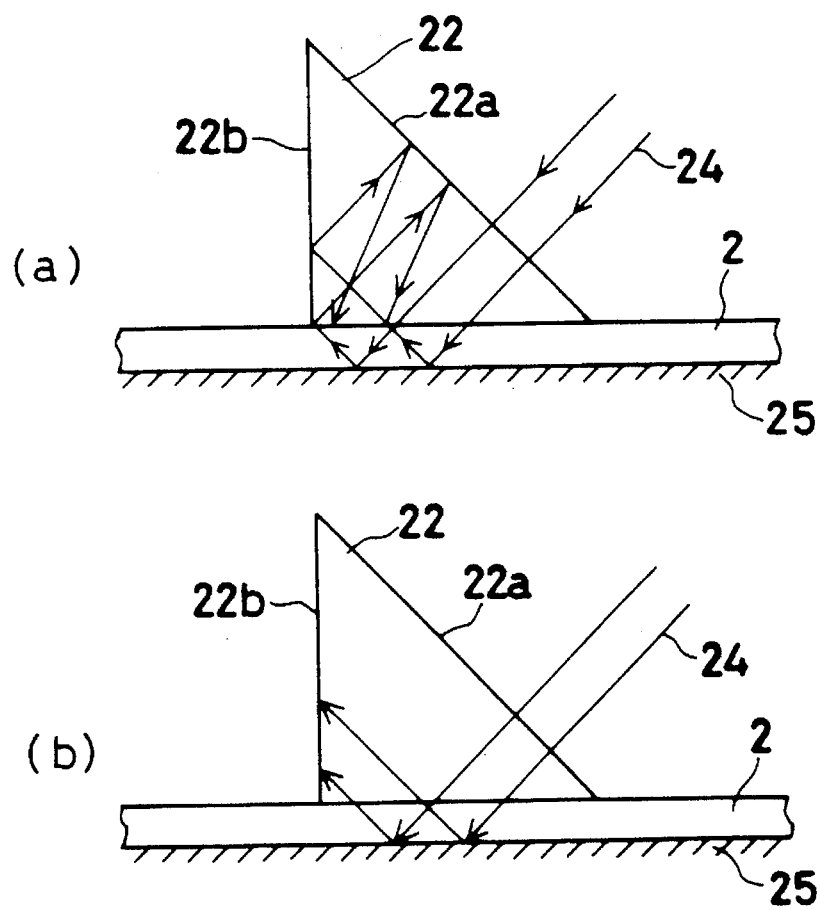
FIG. 12 is a view for explanation of an antireflection treatment.

As shown in FIG. 12(a), the light beam 24 enters the surface 22a of the transparent member 22 at substantially right angles thereto and is reflected by the mirror surface of the roll 25 at the reverse side of the recording film 2. If reflection occurs at a surface 22b of the transparent member 22, the reflected light undesirably enters the recording film 2 and disorders the interference fringes. Therefore, the surface 22b has previously been subjected to a light-absorbing treatment to prevent irregular reflection, as shown in FIG. 12(b). Thus, disorder of the interference fringes can be prevented.

Figure 13:
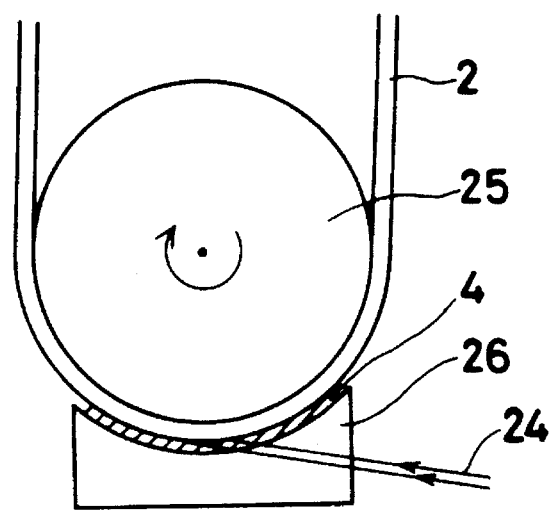
FIG. 13 is a view for explanation of a recording method in which a transparent member is disposed at the lower side of a roll.

It is also possible to dispose a transparent member 26 at the lower side of the roll 25, as shown in FIG. 13. In the arrangement shown in FIG. 13, the surface of the transparent member 26 that faces the roll 25 is an arcuate surface conformable to the surface of the roll 25, and the index matching liquid 4 is dropped onto the arcuate surface. In this state, the recording film 2 is wound on the roll 25 and brought into close contact with the roll 25 and the transparent member 26 by gravity. Thus, the recording film 2 can be brought into close contact with the roll 25 and the transparent member 26 under favorable conditions, and unnecessary stray light can be eliminated. Accordingly, a hologram of good quality can be produced. In this case also, it is preferable that surfaces of the transparent member 26 on which no light beam will be incident have previously been subjected to a light-absorbing treatment.

Next, the hologram recording method of the present invention, which uses the system arrangements shown in FIGS. 1 to 13, will be explained more specifically by way of examples.

(Example 1)

As shown in FIGS. 1 and 2, a recording film 2 (Omnidex 352, a roll film 1 foot in width and 500 feet in length, manufactured by Du Pont Co., Ltd.) was brought into close contact through an index matching liquid 4 (xylene) with a glass block 3 having a convexly curved surface 5 as a surface coming in contact with the recording film 2 and a light incidence surface 6, the other surfaces of the glass block 3 having been subjected to an antireflection treatment by painting them black.

Next, as shown in FIG. 3, light 13 of wavelength 514 nm oscillated from an Ar laser was incident on the concave surface of a plano-concave cylindrical lens 14 and then on the convex surface of a plano-convex cylindrical lens 15 to form a slit-shaped parallel light beam 11. The light beam 11 was then made incident on the surface 6 of the glass block 3 at an angle $\Theta$ of 30° and at a light intensity of 60 mW/cm$^2$ to 75 mW/cm$^2$.

In this state, the recording film 2 was continuously fed at a speed of 0.5 cm/sec. As a result, interference fringes with a pitch of 370 nm were recorded in the recording film 2 over an area 1 foot in width and 450 feet in length in a direction substantially parallel to the recording layer of the recording film 2.

Thereafter, the recording film 2 was irradiated with ultraviolet rays for 1 minute and baked for 1 hour at 100° C., thereby obtaining a diffraction grating having a diffraction efficiency of 46% at a wavelength of 1,110 nm.

The diffraction efficiency was measured as follows. After the formation of the interference fringes, the recording film 2 was cut into a piece about 5 by 5 cm square. The test sample was set in a spectrophotometer (Shimazu double monochromator autographic spectrophotometer UV-365, manufactured by Shimazu Seisakusho Ltd.), and the transmittance with respect to normally incident light in the wavelength range of from 1,400 nm to 400 nm was measured. The value obtained by subtracting the measured transmittance from 100% was regarded as the reflectivity, that is, the diffraction efficiency.

After the formation of the interference fringes, the film was cut into a length of 100 cm, and the cut piece of film was pasted on a window glass. The film reflected solar infrared rays in the region of 1,110 nm, resulting in a lowering of the temperature in the vicinity of the window glass.

(Example 2)

A composition having the following chemical composition was dissolved in 10 g of 1,4-dioxane, and the resulting solution was filtered through a filter having a pore diameter of 0.25 μm to obtain a photosensitive solution.

Polyvinyl carbazole
(Tsubicole 210, manufactured by Anan Koryo Sangyo (K.K.))

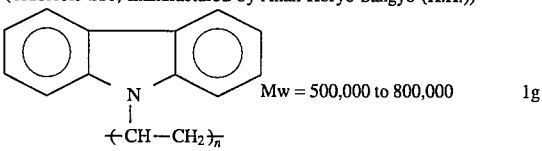

Mw = 500,000 to 800,000    1g

Tribromophenoxyethylacrylate
(New Frontier BR-31, manufactured by Dai-ichi Kogyo Seiyaku Co., Ltd.)

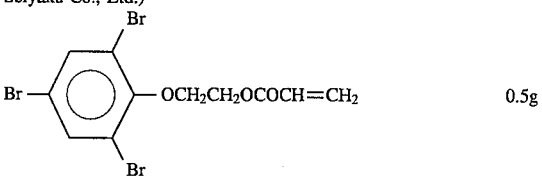

0.5g 3,3', 4,4'-tetra(t-butylperoxycarbonyl)benzophenone

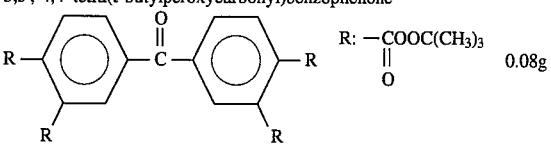

R: —COOC(CH$_3$)$_3$
       ||
       O 0.08g 3,3'-carbonylbis(7-diethylaminocoumarin)

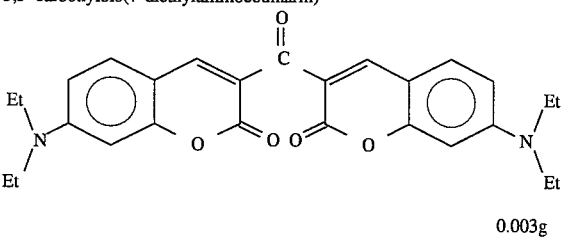

0.003g

The photosensitive solution was coated on a PET film (HP-7, manufactured by Teijin Limited), which had a thickness of 100 μm and had previously been subjected to internal primer coating, by using a roller coater so that the dry film thickness was 5 μm, and then dried for 45 minutes at 70° C. Thereafter, an aqueous solution of 10% polyvinyl alcohol (PVA205, manufactured by Kuraray Co., Ltd.; degree of polymerization 500; and degree of saponification 88%) was coated thereon by using a roller coater. The film coated with the solution was dried for 10 minutes at 60° C., thereby obtaining a recording film 2.

Then, the recording film 2 was continuously fed at a speed of 0.9 cm/sec in a state as shown in FIG. 4, with the polyvinyl alcohol coating surface facing downward and the PET film base material surface facing upward. As the index matching liquid 4, bromobenzene (refractive index 1.56) was used in order to make the refractive index close to that of the recording film 2. In this state, light of wavelength 488 nm oscillated from an Ar laser was made incident on a block of a polyester resin material (refractive index 1.57) at an angle Θ of 27.7° and at a light intensity of 28 mW/cm$^2$ thereby recording interference fringes in the recording film 2.

After the exposure by the Ar laser, the recording film 2 was exposed at an exposure of 0.1 J/cm$^2$ by using an ultraviolet radiation lamp (Chemical Lamp FL-20BL, trade name, manufactured by Toshiba Corp.). At this time, a sharp cut filter L39 was employed so that only visible light of wavelength 400 nm or longer was applied to the recording film 2.

After the exposure, the recording film 2 was washed in a running water bath for 1 minute, thereby removing the polyvinyl alcohol layer. Thereafter, the recording film 2 was dried.

Next, the recording film 2 was dipped for 2 minutes in an acetone bath and then dipped for 1 minute in a heptane bath.

The diffraction efficiency of the hologram thus obtained was measured in the same way as in Example 1. It was 78% at a wavelength in the region of 950 nm. That is, it was possible to obtain a diffraction grating having a diffraction efficiency of 78% and comprising interference fringes with a pitch of 302 nm which were recorded in a direction approximately parallel to the recording layer of the recording film 2. The value of diffraction efficiency, i.e., 78%, was uniform throughout the recording film 2 within ±3%.

It should be noted that the above-described refractive index values were measured at D-lines of sodium with an Abbe's refractometer.

(Example 3)

In the arrangement shown in FIG. 6, the protective film 16 was formed by die-coating the following recording film 2 with an aqueous solution of a polyvinyl alcohol (degree of saponification 88%; and degree of polymerization 500) so that the angle Θ$_3$ of the reflecting surface 17 was 5°. The transparent member 3 had a cylindrical recording film contact surface 5 and a light incidence surface 6, as shown in FIGS. 1 and 6, and surfaces of the transparent member 3, exclusive of the contact surface 5 and the incidence surface 6, had previously been subjected to an antireflection treatment by painting them black.

The recording film 2 (Omnidex 352, a film 1 foot in width and 500 feet in length, manufactured by Du Pont Co., Ltd.) was brought into close contact with the transparent member 3 through xylene used as an index matching liquid 4.

Next, as shown in FIG. 3, light 13 of wavelength 514 nm oscillated from an Ar laser was incident on the concave surface of a plano-concave cylindrical lens 14 and then on the convex surface of a plano-convex cylindrical lens 15 to form a slit-shaped parallel light beam 11. The light beam 11 was then made incident on the surface 6 of the glass block 3 at an angle Θ$_1$ of 20° and at a light intensity of 60 mW/cm$^2$ to 75 mW/cm$^2$.

In this state, the recording film 2 was continuously fed at a speed of 1 cm/sec. As a result, interference fringes having a pitch of about 400 nm and inclined at 5° with respect to the film surface were recorded in the recording film 2 over an area 1 foot in width and 450 feet in length.

Thereafter, the recording film 2 was irradiated with ultraviolet rays for 1 minute by using an H-bulb lamp for F-450, manufactured by Fusion Co. Ltd., and baked for 1 hour at 100° C. thereby obtaining a diffraction grating having a diffraction efficiency of 50% at a wavelength of 1,200 nm. The diffraction efficiency was measured in the same way as in Example 1.

When the film was inclined at 5° the above maximum diffraction efficiency was obtained.

After the formation of the interference fringes, the film was cut into a piece of a window glass size, and the cut piece of film was pasted on a window glass so that the sunlight was incident nearly normally on the inclined interference fringes. The film reflected solar infrared rays in the region of 1,200 nm, resulting in a lowering of the temperature in the vicinity of the inside of the window glass. When the film was peeled from the window glass, a rise in temperature was observed.

(Example 4)

A photosensitive solution having the same chemical composition as that in Example 2 was coated on a PET film (HP-7, manufactured by Teijin Limited), which had a thickness of 100 μm and had previously been subjected to internal primer coating, by using a roller coater so that the dry film thickness was 8 μm, and then dried for 45 minutes at 70° C. Thereafter, a solution of 30% poly(p-hydroxystyrene) in isopropyl alcohol was coated thereon by using a dip coater. The film coated with the solution was transported being erected in a direction perpendicular to the direction of the film thickness, and after 5 seconds had elapsed, the film was dried for 10 minutes at 60° C., thereby obtaining a recording film 2.

Then, the recording film 2 was continuously fed at a speed of 0.9 cm/sec, and in this state, light of wavelength 488 nm oscillated from an Ar laser was made incident on a transparent member 3 made of F2 glass (manufactured by (K.K.) Miyuki Kogaku Kogyo; refractive index 1.61989) at an angle $\Theta_1$ of 13° and at a light intensity of 28 mW/cm², thereby recording interference fringes in the recording film 2.

After the exposure by the Ar laser, the recording film 2 was exposed at an exposure of 0.1 J/cm² by using an ultraviolet radiation lamp (Chemical Lamp FL-20BL, manufactured by Toshiba Corp.). At this time, a sharp cut filter L39 was employed so that only visible light of wavelength 400 nm or longer was applied to the recording film 2.

After the exposure, the recording film 2 was washed in an isopropyl alcohol bath for 1 minute, thereby removing the poly(p-hydroxystyrene) layer. Thereafter, the recording film 2 was dried.

Next, the recording film 2 was dipped for 2 minutes in an acetone bath and then dipped for 1 minute in a heptane bath.

The diffraction efficiency of the hologram thus obtained was measured in the same way as in Example 1. It was 78% at a wavelength in the region of 950 nm due to contraction after the development. That is, it was possible to obtain a diffraction grating having a diffraction efficiency of 78% and comprising interference fringes with a pitch of about 298 nm which were recorded at an inclination angle of 8° with respect to the recording layer of the recording film 2. The value of diffraction efficiency, i.e., 78%, was uniform throughout the recording film 2 within ±3%.

It should be noted that the above-described refractive index values were measured at D-lines of sodium with an Abbe's refractometer.

(Example 5)

A reflector 18 made of a glass block material was used. The angle $\Theta_3$ (see FIG. 8) of the reflecting surface 19 of the reflector 18 was set at 20°. As shown in FIGS. 7 and 8, the recording film contact surface 5 of the transparent member 3 had a convex cylindrical configuration, whereas the contact surface 5 of the reflector 18 had a concave cylindrical configuration conformable to the convex contact surface 5 of the transparent member 3. Surfaces of the transparent member 3 and the reflector 18, exclusive of the light incidence surface 6 and the cylindrical contact surfaces 5, had previously been subjected to an antireflection treatment by painting them black.

A recording film 2 (Omnidex 352, a film 1 foot in width and 500 feet in length, manufactured by Du Pont Co., Ltd.) was brought into close contact with the transparent member 3 and the reflector 18 through xylene used as an index matching liquid 4.

Next, as shown in FIG. 3, light 13 of wavelength 514 nm oscillated from an Ar laser was incident on the concave surface of a plano-concave cylindrical lens 14 and then on the convex surface of a plano-convex cylindrical lens 15 to form a slit-shaped parallel light beam 11. The light beam 11 was then made incident on the surface 6 of the glass block 3 at an angle $\Theta_1$ of 10° and at a light intensity of 60 mW/cm² to 75 mW/cm².

In this state, the recording film 2 was continuously fed at a speed of 1 cm/sec. As a result, interference fringes having a pitch of about 370 nm and inclined at 20° with respect to the film surface were recorded in the recording film 2 over an area 1 foot in width and 450 feet in length in a direction substantially parallel to the recording layer of the recording film 2.

Thereafter, the recording film 2 was irradiated with ultraviolet rays for 1 minute by using an H-bulb lamp for F-450, manufactured by Fusion Co. Ltd., and baked for 1 hour at 100° C., thereby obtaining a diffraction grating having a diffraction efficiency of 50% at a wavelength of 1,100 nm. The diffraction efficiency was measured in the same way as in Example 1.

When the film was inclined at 20°, the above maximum diffraction efficiency was obtained.

After the formation of the interference fringes, the film was cut into a piece of a window glass size, and the cut piece of film was pasted on a window glass so that the sunlight was incident nearly normally on the inclined interference fringes. The film reflected solar infrared rays in the region of 1,110 nm, resulting in a lowering of the temperature in the vicinity of the inside of the window glass. When the film was peeled from the window glass, a rise in temperature was observed.

(Example 6)

A photosensitive solution having the same chemical composition as that in Example 2 was coated on a PET film (HP-7, manufactured by Teijin Limited), which had a thickness of 100 μm and had previously been subjected to internal primer coating, by using a roller coater so that the dry film thickness was 5 μm, and then dried for 45 minutes at 70° C. Thereafter, an aqueous solution of 10% polyvinyl alcohol (manufactured by Kuraray Co., Ltd.; degree of polymerization 500; and degree of saponification 88%) was coated thereon by using a roller coater. The film coated with the solution was dried for 10 minutes at 60° C. thereby obtaining a recording film 2.

Next, with a staircase-shaped reflector 18 ($\Theta_3=15°$) as shown in FIG. 9 used, the recording film 2 was continuously fed at a speed of 0.9 cm/sec. As the index matching liquid 4, xylene was used in order to make the refractive index close to that of the recording film 2. In this state, light of wavelength 488 nm oscillated from an Ar laser was made incident on a transparent member 3 of F2 glass (manufactured by (K.K.) Miyuki Kogaku Kogyo; refractive index 1.61989) at an angle $\Theta_1$ of 13° and at a light intensity of 28 mW/cm², thereby recording interference fringes in the recording film 2.

After the exposure by the Ar laser, the recording film 2 was exposed at an exposure of 0.1 J/cm² by using an ultraviolet radiation lamp (Chemical Lamp FL-20BL, manufactured by Toshiba Corp.). At this time, a sharp cut filter L39 was employed so that only visible light of wavelength 400 nm or longer was applied to the recording film 2.

After the exposure, the recording film 2 was washed in a running water bath for 1 minute, thereby removing the polyvinyl alcohol layer. Thereafter, the recording film 2 was dried.

Next, the recording film 2 was dipped for 2 minutes in an acetone bath and then dipped for 1 minute in a heptane bath.

The diffraction efficiency of the hologram thus obtained was measured in the same way as in Example 1. It was 78% at a wavelength in the region of 1,000 nm. That is, it was possible to obtain a diffraction grating having a diffraction efficiency of 78% and comprising interference fringes with a pitch of about 310 nm which were recorded at an inclination angle of 15° with respect to the recording layer of the recording film 2. The value of diffraction efficiency was uniform throughout the recording film 2 within ±3%.

It should be noted that the above-described refractive index values were measured at D-lines of sodium with an Abbe's refractometer.

(Example 7)

Figure 14:
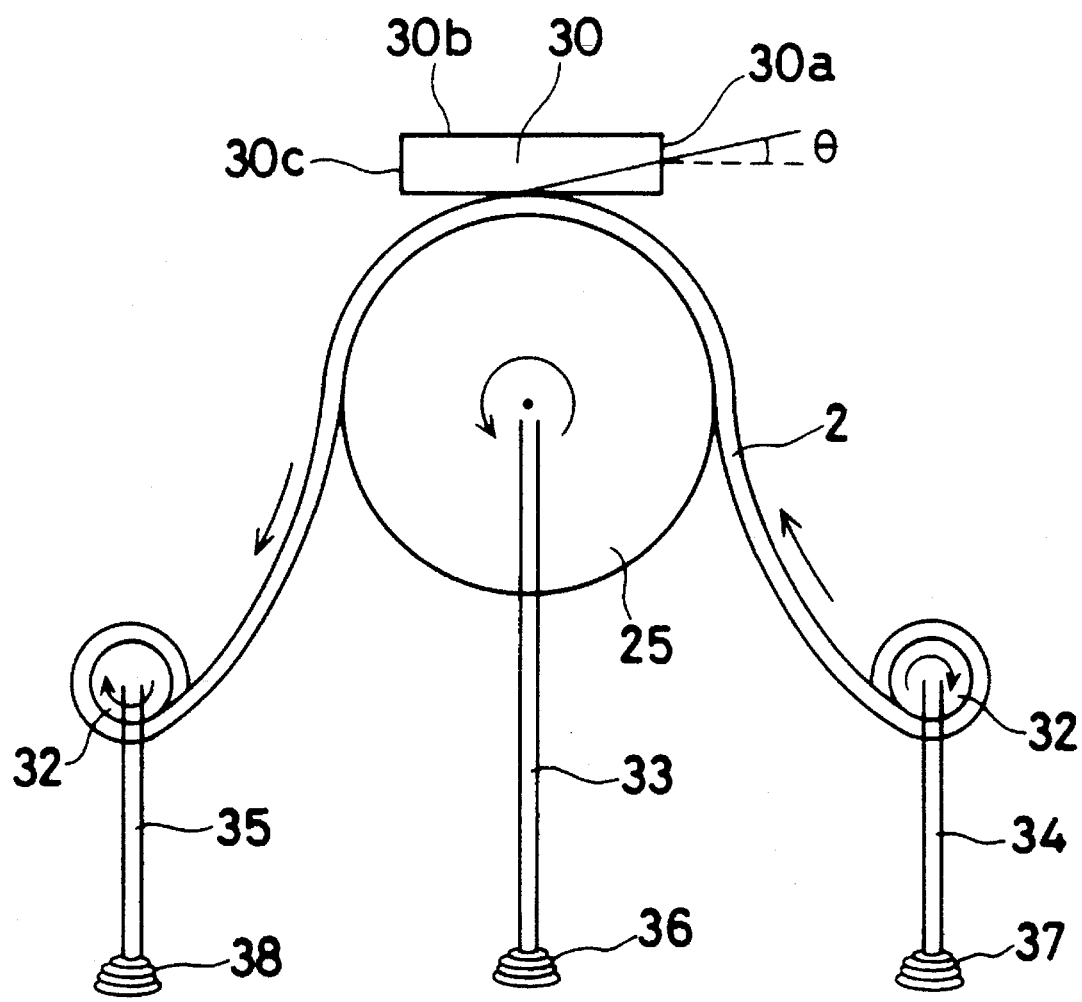
FIG. 14 is a view for explanation of one embodiment of the recording method shown in FIG. 10.

As shown in FIG. 14, a roll 25, a film supply roll 31, and a take-up roll 32 were supported by respective support rods 33, 34 and 35 and respective shockabsorbing desks 36, 37 and 38. Air was injected into the shockabsorbing desks 36, 37 and 38 to provide shockabsorbing effect. The roll 25 had a light-reflecting surface formed by chrome plating. As the recording film 2, Omnidex 352 (manufactured by Du Pont Co. Ltd.) having a width of 30 cm was used. The recording film 2 was brought into close contact with the roll 25 through xylene used as an index matching liquid. A glass block 30 was brought into close contact with the recording film 2 through xylene used as an index matching liquid. As an incident light beam, light of wavelength 488 nm emitted from an Ar laser was diffused through a spatial filter and then formed into a parallel beam of light by a parabolic mirror. The light beam was made incident on a surface 30a of the glass block 30 at an angle $\Theta$ of 15°. In this state, the recording film 2 was exposed at an exposure of 20 mJ/cm². As a result, interference fringes with a pitch of 1.4 μm were recorded in the recording film 2 in parallel to the film surface. Thereafter, the recording film 2 was baked for 2 hours at 120° C., thereby obtaining a diffraction grating having a diffraction efficiency of 70%. However, unnecessary rainbow due to reflection at the interfaces 30b and 30c between the glass block 30 and the air was observed.

(Example 8)

The surfaces 30b and 30c of the glass block 30 in Example 7 were subjected to an antireflection treatment, and recording was carried out using this glass block 30 in the same way as in Example 7. As a result, a diffraction efficiency similar to the above was obtained, and unnecessary rainbow was not observed any longer.

After the interference fringes had been formed in this way, the recording film 2 was cut into a piece 55 by 55 cm square, and the cut piece of film was pasted on a window glass. The film reflected solar infrared rays in the region of 1.4 μm, resulting in a lowering of the temperature in the room.

(Example 9)

The roll 25 and the transparent member 26 were arranged as shown in FIG. 13. Omnidex 352 (manufactured by Du Pont Co. Ltd.; a roll film having a width of 30 cm) used as a recording material was brought into close contact with the chrome-plated roll 25 through xylene used as an index matching liquid. Surfaces of the transparent member 26 on which no light would be incident had previously been subjected to an antireflection treatment. The index matching liquid of xylene was dropped onto the surface of the transparent member 26 that faced the roll 25, and the roll 25 having the recording film brought into contact therewith was placed thereon, thereby bringing the recording film 2 into close contact with the roll 25 and the transparent member 26 by gravity. The recording film 2 was allowed to stand for 2 minutes in this state. Then, recording was carried out in the same way as in Example 7. As a result, interference fringes similar to those in Example 8 were obtained.

The hologram recording method described in the foregoing examples is one example of the present invention, and the present invention is not limited to these examples.

It will be apparent that in the method of the present invention wherein interference fringes are obliquely recorded, the recording film may be either fed or unmoved. Further, it will be apparent that the feed of the recording film may be either continuous or intermittent. Further, it will also be apparent that the exposure process may be either continuous or intermittent.

It is a matter of course that the present invention can be carried out in various forms within the scope of the invention and that these forms are included in the present invention.

As will be clear from the foregoing description, according to the hologram recording method and recorded hologram of the present invention, a transparent member is disposed at one surface of a recording film, and the space between the recording film and the film contact surface of the transparent member is filled with an index matching liquid so that the recording film is brought into close contact with the transparent member through the index matching liquid. In this state, a light beam is made incident on a surface of the transparent member other than the recording film contact surface so that the incident light beam reaching the recording film through the contact surface and the light beam reflected from the interfacial boundary between the reverse surface of the recording film and the air interfere with each other in the recording film, thereby forming and recording interference fringes in the recording film. Accordingly, even if the angle of incidence of the light beam to the surface of the recording film is small, exposure of high efficiency can be realized. In addition, it is possible to select various pitches for interference fringes to be recorded by varying the angle of the incident light beam to the surface of the recording film.

If a recording film of continuous length is subjected to exposure using a linear light beam while being continuously fed, it becomes possible to readily produce a uniform, high-quality hologram having a large area. Thus, it is possible to provide a hologram producing method which gives a high yield and is suitable for mass-production.

Further, a surface of the transparent member that is brought into close contact with the recording film is convexly curved only in the direction of feed of the recording film, and the space between the recording film contact surface and the recording film is filled with an index matching liquid so that the recording film is brought into close contact with the transparent member through the index matching liquid. Therefore, the condition of contact between the recording film and the transparent member improves, so that the recording film moves smoothly when fed. Accordingly, the recording film will not be flawed by contact with the contact surface of the transparent member, and no air bubbles will get mixed in the index matching liquid. Thus, the thickness of the index matching liquid can be made small and uniform. In addition, the reverse surface of the recording film will not be contaminated with the index matching liquid, and the recording film can be uniformly irradiated with the incident light beam and the reflected light beam. Accordingly, it is possible to continuously record a uniform, excellent hologram having a large area. Furthermore, interference fringes can be formed in the recording film such that a large number of interference fringes slightly different in the angle of inclination are superimposed one on top of another by virtue of the configuration of the contact surface of the transparent member. Therefore, a holographic mirror thus recorded in the recording film provides a diffraction spectrum which is not a line spectrum but a broad band spectrum. Accordingly, it is possible to obtain a holographic mirror suitable for a solar reflector or the like which reflects light only in the infrared region.

If a surface of the recording film that will not come in contact with the transparent member is formed with a layer having a thickness distribution in a direction perpendicular to the direction of feed of the recording film so that the incident light beam is reflected at this layer, it is possible to form interference fringes inclined with respect to the surface of the recording film. Thus, the method is suitable for production of a solar reflector or the like.

If surfaces of the transparent member, exclusive of the light beam incidence surface and the recording film contact surface, have previously been subjected to a light-absorbing treatment, it is possible to prevent irregular reflection and to minimize the disorder of interference fringes. In addition, no light will impinge on portions of the recording film other than the exposed portion thereof. Thus, it becomes unnecessary to install a large-sized light-shielding plate.

What we claim is:

1. A method of recording a hologram in a continuously fed recording film by interference of light, said method comprising:

disposing a transparent member, which is elongated in a direction traverse to a direction of feed of said recording film, at one surface of said recording film, said transparent member having a surface which is brought into close contact with said recording film, said contact surface being convexly curved only in said direction of feed of said recording film;

bringing said recording film into close contact with said transparent member through an index matching liquid filling a space between said contact surface and said recording film;

and making a beam of light incident on a surface of said transparent member other than said contact surface so that the incident light beam reaching said recording film through said contact surface and the light beam reflected from an interfacial boundary between a reverse surface of said recording film and air interfere with each other in said recording film, thereby forming and recording interference fringes in said recording film.

2. A hologram recording method according to claim 1, wherein said light beam, which is made incident on a surface of said transparent member other than said contact surface, is a light beam that is reciprocated to scan in a direction intersecting the direction of feed of said recording film so that the scanning light beam reaching said recording film through said contact surface and the light beam reflected from the interfacial boundary between the reverse surface of said recording film and the air interfere with each other in said recording film, thereby forming and recording interference fringes in said recording film.

3. A hologram recording method according to claim 2, wherein said interference fringes have broad wavelength.

4. A hologram recording method according to claim 1, wherein a surface of said recording film on a side thereof which will not come in contact with said transparent member is formed with a layer having a thickness distribution in a direction perpendicular to the direction of feed of said recording film so that the incident light beam is reflected at the surface of this layer.

5. A hologram recording method according to any one of claims 1, 2 or 4, wherein surfaces of said transparent member, exclusive of said light beam incidence surface and said contact surface, have previously been subjected to a light-absorbing treatment, and portions of said recording film other than the irradiated portion thereof are shielded from light.

6. A hologram recording method according to claim 4, wherein said layer having a thickness distribution has a distribution in which the layer thickness gradually increases.

7. A hologram recording method according to claim 6, wherein an angle between the surface of said layer having the thickness distribution and the surface of said recording film is larger than 0° and not larger than 10°.

8. A hologram recording method according to claim 4, wherein the interference fringes recorded in said recording film are inclined at an angle larger than 0° and not larger than 10° with respect to the film surface.

9. A hologram recording method according to claim 1, wherein said interference fringes have broad wavelength.

10. A hologram recording method according to any one of claims 1, 2 or 4, wherein said transparent member is made of a material having a refractive index differing from that of said recording film by 0.2 or less in the temperature range of from 15° C. to 25° C.

11. A hologram recording method according to claim 10, wherein a principal component of said recording film is a polyvinyl carbazole derivative, and said transparent member is made of F2 glass, a polyester resin, an allyl resin having a high refractive index, or an acrylic resin having a high refractive index.

12. A hologram recording method according to claim 10, wherein a principal component of said recording film is a polyvinyl acetate derivative, and said transparent member is made of BK-7 glass or quartz glass.

13. A hologram recording method according to claim 10, wherein a principal component of said recording film is a polyester, and said transparent member is made of F2 glass.

14. A hologram recording method according to any one of claims 1 to 3, wherein said light beam is incident on said incidence surface of said transparent member at an angle of 90°±10° to said incidence surface.

15. A hologram recording method according to claim 14, wherein said light beam is not substantially reflected or refracted as said light beam travels from said incident surface to said recording film.

16. A hologram recording method according to any one of claims 1, 2 or 4, wherein said contact surface has a curvature radium in the range of from 10 mm to 100 mm.

17. A hologram recording method according to any one of claims 1, 2 or 4, wherein an angle made between one side surface of said transparent member and said recording film when said recording film comes in contact with said contact surface and an angle made between another side surface of said transparent member and said recording film when said recording film comes out of the contact with said contact surface are both in the range of from 5° to 45°.

18. A hologram recording method according to any one of claims 1, 2 or 4, wherein a size of said incident light beam in the direction of feed of said recording film is not larger than 3 mm with regard to beam sizes which provide at least 13.5% of a maximum intensity.

19. A hologram recording method according to any one of claims 1, 2 or 4, wherein a tension of 10 kg/m to 50 kg/m is applied to said recording film, and the thickness of said index matching liquid between said recording film and said contact surface is not larger than 500 μm.

20. A hologram recording method according to any one of claims 1, 2 to 4, Wherein said transparent member is disposed at an upper side of said recording film.

21. A hologram recording method according to any one of claims 1, 2 or 4, wherein said transparent member is disposed at a lower side of said recording film.

22. A method of recording a hologram in a continuously fed recording film by interference of light, said method comprising:

sandwiching said recording film between a transparent member, which is elongated in a direction traverse to a direction of feed of said recording film, disposed at a side where a light beam enters and a reflector disposed at a side where the light beam reflects, wherein said transparent member has a contact surface which contacts said recording film and a light incidence surface which is different than said contact surface and wherein said contact surface is convexly curved only in said direction of feed of said recording film; and making the light beam incident on said light incidence surface so that the incident light beam reaching said recording film and the light beam transmitted by said recording film and reflected from a reflecting surface of said reflector interfere with each other in said recording film, thereby forming and recording interference fringes in said recording film.

23. A hologram recording method according to claim 22, wherein said interference fringes have broad wavelength.

24. A hologram recording method according to claim 22, wherein said reflecting surface and the surface of said recording film are disposed at an angle to each other to vary the angle of the reflected light beam to thereby record oblique interference fringes in said recording film.

25. A hologram recording method according to claim 22, or 24, wherein said reflecting surface is formed in a staircase shape to make an angle between said reflecting surface and the surface of said recording film, thereby varying the angle of said reflected light beam, and thus recording oblique interference fringes in said recording film.

26. A hologram recording method according to claim 22, or 24, wherein said reflecting surface has a holographic reflecting layer thereon so that the angle of said reflected light beam is varied by said holographic reflecting layer, thereby recording oblique interference fringes in said recording film.

27. A hologram recording method according to claim 22 or 24, wherein a linear light beam is used as said incident light beam, and said recording film is fed along the respective recording film contact surfaces of said transparent member and said reflector.

28. A hologram recording method according to claim 22 or 24, wherein one of said recording film contact surfaces of said transparent member and said reflector is a convex surface, and the other is a concave surface.

29. A hologram recording method according to claim 22 or 24, wherein a space between said recording film and said transparent member is filled with an index matching liquid so that said recording film is brought into close contact with said transparent member through said index matching liquid.

30. A hologram recording method according to claim 29, wherein a space between said recording film and said reflector is filled with an index matching liquid so that said recording film is brought into close contact with said reflector through said index matching liquid.

31. A hologram recording method according to claim 22 or 24, wherein a difference between refractive indices of said transparent member, said recording film and said index matching liquid is not larger than 0.2 in the temperature range of from 15° C. to 25° C.

32. A hologram recording method according to claim 22 or 24, wherein said reflector is a transparent member, and a difference between refractive indices of said reflector, said recording film and said index matching liquid is not larger than 0.2 in the temperature range of from 15° C. to 25° C.

33. A hologram recording method according to claim 22 or 24, wherein said reflecting surface of said reflector is said recording film contact surface.

34. A hologram recording method according to claim 22 or 24, wherein said reflector has said reflecting surface elsewhere than said recording film contact surface.

35. A hologram recording method according to claim 22 or 24, wherein said reflecting surface defines an interface in cooperation with air.

36. A hologram recording method according to claim 22 or 24, wherein said reflecting surface has a mirror reflecting layer thereon.

37. A hologram recording method according to claim 22 or 24, wherein surfaces of said transparent member, exclusive of said light incidence surface and said recording film contact surface, are light-absorbing surfaces, and portions of said recording film other than the portion thereof where said interference is to be caused are shielded from light.

38. A hologram recording method according to claim 22 or 24, wherein an angle between a normal to said light incidence surface and said incident light beam is in the range of from 0° to 10°.

39. A hologram recording method according to claim 38, wherein said light beam is not substantially reflected or refracted as said light beam travels from said light incident surface toward said recording film.

40. A hologram recording method according to claim 22 or 24, wherein a space between said recording film and said reflector is filled with an index matching liquid so that said recording film is brought into close contact with said reflector through said index matching liquid.

41. A hologram comprising equally spaced interference fringes recorded in a recording film, wherein said interference fringes are parallel to at least one direction of a plane of said recording film, wherein disorder of the interference fringes in a cross-section along said direction is larger than disorder of the interference fringes in a cross-section along a direction perpendicular to said direction.

42. A hologram according to claim 41, wherein the interference fringes in the cross-section along the direction perpendicular to the first-mentioned direction are at an angle to the plane of said recording film.

* * * * *